United States Patent
Ishida et al.

(10) Patent No.: US 10,875,418 B2
(45) Date of Patent: Dec. 29, 2020

(54) CHARGE CONTROL APPARATUS AND SYSTEM

(71) Applicant: DENSO CORPORATION, Kariya (JP)

(72) Inventors: Minoru Ishida, Kariya (JP); Naoki Katayama, Kariya (JP); Tsubasa Sakuishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/504,746

(22) Filed: Jul. 8, 2019

(65) Prior Publication Data

US 2020/0009980 A1    Jan. 9, 2020

(30) Foreign Application Priority Data

Jul. 9, 2018 (JP) ................................. 2018-130105

(51) Int. Cl.
| | |
|---|---|
| *B60L 53/14* | (2019.01) |
| *B60L 53/62* | (2019.01) |
| *B60L 58/12* | (2019.01) |
| *B60L 53/24* | (2019.01) |

(52) U.S. Cl.
CPC ............. *B60L 53/62* (2019.02); *B60L 53/14* (2019.02); *B60L 53/24* (2019.02); *B60L 58/12* (2019.02)

(58) Field of Classification Search
CPC .......... B60L 53/10; B60L 53/14; B60L 53/24; B60L 53/62; B60L 58/12; B60L 58/13

USPC .................................................. 307/9.1, 10.1
See application file for complete search history.

(56) References Cited

U.S. PATENT DOCUMENTS

| | | | |
|---|---|---|---|
| 10,727,545 B1* | 7/2020 | Gan .................. | H01M 10/4235 |
| 2011/0227534 A1* | 9/2011 | Mitsutani ................ | B60L 50/61 |
| | | | 320/109 |
| 2012/0112693 A1 | 5/2012 | Kusch et al. | |
| 2015/0236524 A1* | 8/2015 | Takano ............... | H01M 10/443 |
| | | | 320/107 |
| 2016/0200214 A1* | 7/2016 | Ishibashi ................. | B60L 58/12 |
| | | | 180/65.1 |

FOREIGN PATENT DOCUMENTS

JP    2011-130593 A    6/2011

* cited by examiner

*Primary Examiner* — William Hernandez
(74) *Attorney, Agent, or Firm* — Oliff PLC

(57) ABSTRACT

In a charging control apparatus, a supply power requestor requests an external power source to output supply power having a constant voltage and a constant current. A voltage conversion instructor instructs a voltage conversion device to perform voltage conversion of the supply power from the external power source such that converted supply power has a charging voltage and a charging current that are respectively within allowable charging-voltage range and allowable charging-current range. The voltage conversion instructor instructs the voltage conversion device to output the converted supply power to the power storage to thereby charge the power storage.

13 Claims, 9 Drawing Sheets

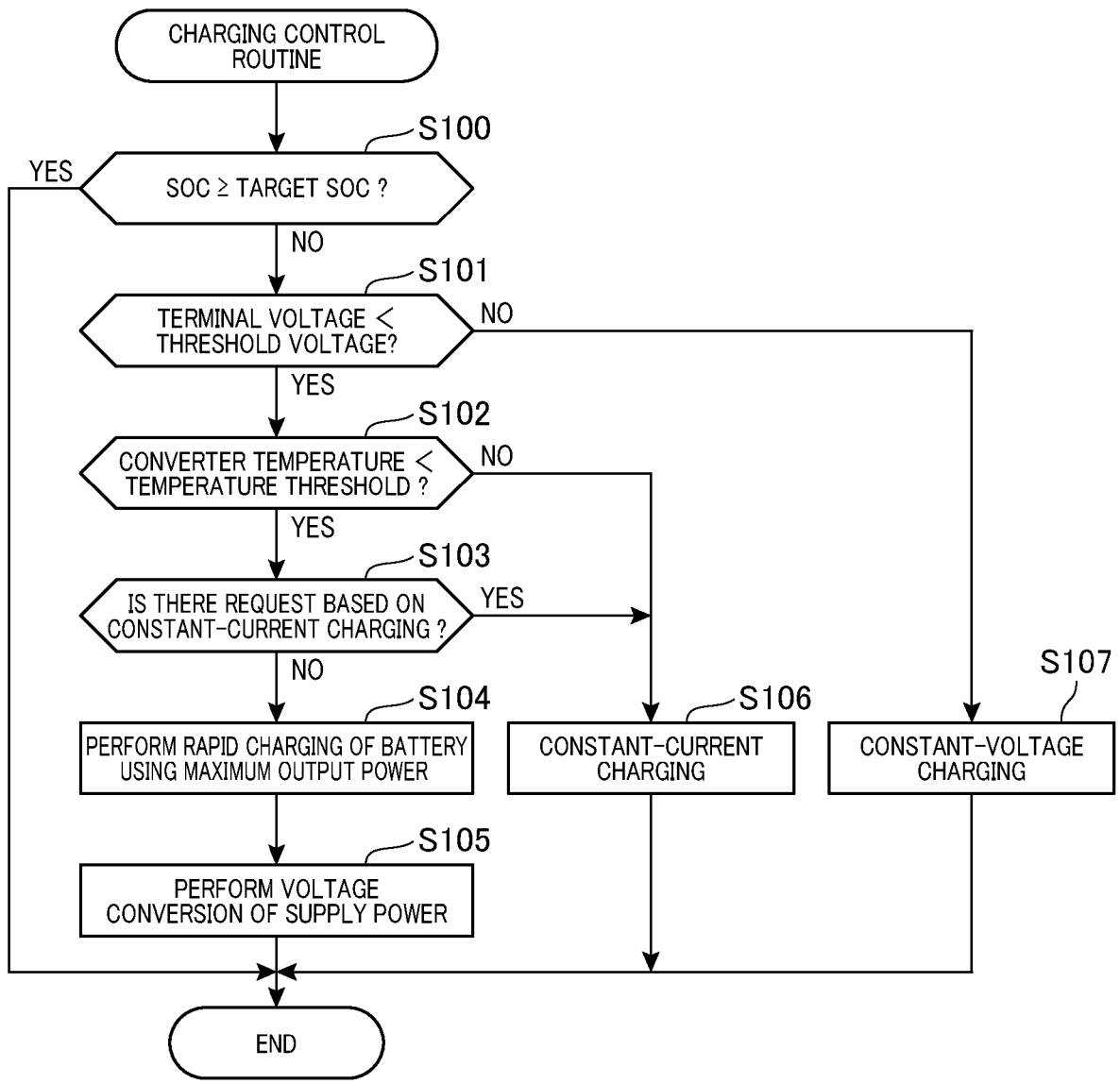

CHARGE CONTROL APPARATUS AND SYSTEM

CROSS REFERENCE TO RELATED APPLICATION

This application is based on and claims the benefit of priority from Japanese Patent Application No. 2018-130105 filed on Jul. 9, 2018, the disclosure of which is incorporated in its entirety herein by reference.

TECHNICAL FIELD

The present disclosure relates to apparatuses and systems for controlling charging of a battery to be installed in a vehicle

BACKGROUND

Some known charging devices are capable of charging rapidly a battery installed in a vehicle.

SUMMARY

According to an exemplary aspect of the present disclosure, there is provided a charging control apparatus applicable to a vehicle that performs charging of a chargeable and dischargeable power storage based on supply power from an external power source.

A voltage conversion instructor of the charging control apparatus is configured to instruct a voltage conversion device to (1) Perform voltage conversion of the supply power from the external power source such that converted supply power has a charging voltage and a charging current that are respectively within the allowable charging-voltage range and allowable charging-current range (2) Output the converted supply power to the power storage to thereby charge the power storage

BRIEF DESCRIPTION OF THE DRAWINGS

Other aspects of the present disclosure will become apparent from the following description of embodiments with reference to the accompanying drawings in which:

FIG. 2 is a table schematically illustrating a charging performance of each of a battery and a charging device illustrated in FIG. 1;

FIG. 3 is a flowchart schematically illustrating a charging control routine carried out by an ECU illustrated in FIG. 1;

DESCRIPTION OF EMBODIMENT

Inventor's View Point

Figure 1:
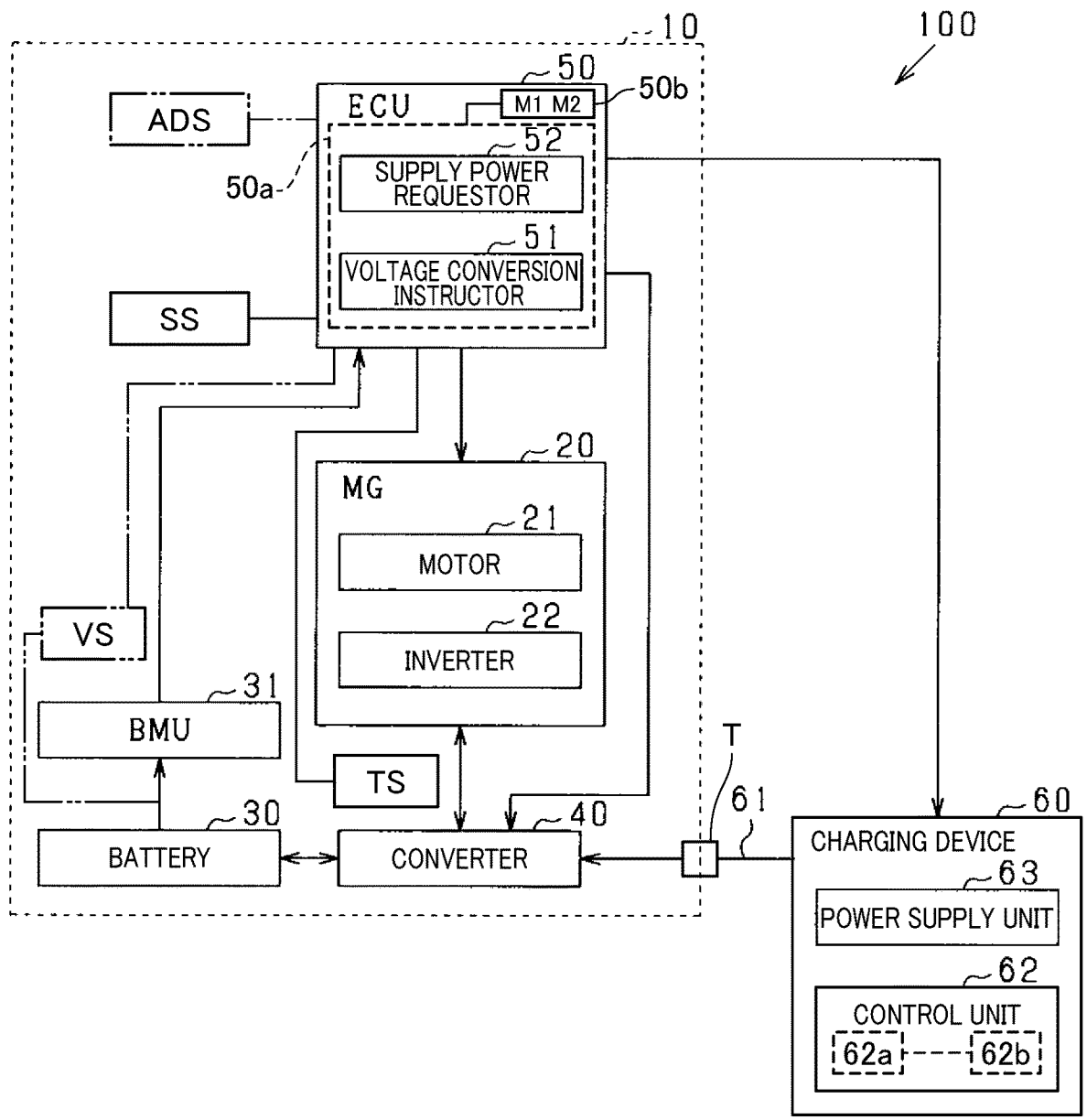
FIG. 1 is a block diagram schematically illustrating an example of the structure of a charging control system according to the first embodiment of the present disclosure.

Some known charging devices are capable of charging rapidly a battery installed in a vehicle. An example of these charging devices is disclosed in Japanese Patent Application Publication No. 2011-130593. Such a charging device usually carries out a charging task in a constant-current (CC) mode and a constant-voltage (CV) charging (CC-CV charging) mode or a CC charging mode. In the CC-CV charging mode, the charging device charges, in the CC charging mode, a battery based on a predetermined constant current until a terminal voltage across the battery has reached a predetermined voltage, and then charges, in a CV charging mode, the battery based on a predetermined constant voltage after the terminal voltage across the battery has reached the predetermined voltage. This configuration of the charging device enables the battery to be fully charged while preventing overcharging of the battery and/or overcurrent being supplied to the battery.

That is, the CC-CV charging mode charges a battery using both a predetermined constant current and a predetermined constant voltage, and the CC charging charges a battery using a predetermined constant current.

Charging devices, each of which uses one of the CC-CV charging mode and the CC charging mode, has a predetermined outputtable power range including predetermined upper limit power. These charging devices, which will also be referred to as target charging devices, unfortunately may not supply the upper limit power to a battery while charging the battery in one of the CC-CV charging mode and the CC charging mode.

For example, let an upper limit output voltage, i.e. a maximum output voltage, and an upper limit output current, i.e. a maximum output current, of a target charging device be respectively 1000 V and 350 A, i.e. the upper limit output power, i.e. the maximum output power, of the target charging device be 350 kW. Additionally, let an upper limit of the terminal voltage across a battery be approximately 800 V.

When charging the battery using the CC charging mode, the target charging device is capable of charging the battery using the constant current of 350 A, because the upper limit output current is set to 350 A. The target charging device however cannot supply, to the battery, an output voltage having the upper limit output voltage of 800 V in the CC charging mode, because the actual output voltage of the target charging device depends on the terminal voltage across the battery.

Similarly, the output voltage of a target charging device during the CV charging mode is limited to the upper limit output voltage.

That is, each of the target charging devices, which uses one of the CC-CV charging mode and the CC charging mode, cannot take full advantage of the charging capability thereof. This may make it difficult to sufficiently shorten charging time of a battery.

From the above viewpoint, the present disclosure seeks to provide charge control apparatuses and systems, each of which is capable of shortening charging time of a battery.

According to a first exemplary aspect of the present disclosure, there is provided a charging control apparatus applicable to a vehicle that performs charging of a chargeable and dischargeable power storage based on supply power from an external power source. The power storage has a predetermined allowable charging-power range, a predetermined allowable charging-voltage range, and a predetermined allowable charging-current range. The charging control apparatus includes a supply power requestor configured to request the external power source to output supply power having a constant voltage and a constant current, a voltage conversion device, and a voltage conversion instructor.

The voltage conversion instructor is configured to instruct the voltage conversion device to (1) Perform voltage conversion of the supply power from the external power source such that converted supply power has a charging voltage and a charging current that are respectively within the allowable charging-voltage range and allowable charging-current range (2) Output the converted supply power to the power storage to thereby charge the power storage The charging control apparatus according to the exemplary aspect requests the external power source to output the supply power having the constant voltage and constant current. This configuration enables an increase of each of the constant voltage and constant current of the supply power, thus increasing the level of the supply power to be output to the power storage. This therefore results in a charging time of the power storage being shorter.

The charging control apparatus according to the exemplary aspects is configured to perform voltage conversion of the supply power from the external power source such that converted supply power has a charging voltage and a charging current that are respectively within the allowable charging-voltage range and allowable charging-current range. This configuration therefore enables the power storage to be reliably charged to while preventing overcurrent flowing to the power storage and overcharging of the power storage.

EMBODIMENT

According to the inventor's viewpoint, the following describes charge control apparatuses and charge control systems, which are embodiments of the present disclosure, with reference to the accompanying drawings. Charging devices described in the following embodiments are applied to electric vehicles and/or hybrid vehicles; these vehicles are propelled using power supplied from a battery. In the embodiments, similar or equivalent parts between the embodiments, to which like reference characters are assigned, are omitted or simplified to avoid redundant description.

First Embodiment

The following describes the first embodiment of the present disclosure with reference to FIGS. 1 to 6.

As illustrated in FIG. 1, a charge control system 100 according to the first embodiment includes a vehicle 10, and a charging device 60 that serves as, for example, an external power source, which is located outside the vehicle 10. The charging device 60 has, for example, a pair of positive and negative terminals, and is configured to supply electrical power between the positive and negative terminals to the vehicle 10.

The vehicle 10 includes, for example, a motor-generator (MG) 20 as an example of a rotary electric machine, a battery 30 as an example of a chargeable and dischargeable power storage, a battery management unit (BMU) 31, a converter, i.e. a voltage conversion device, 40, and an electronic control unit (ECU) 50.

The MG 20 is electrically connected to the converter 40, and the converter 40 is electrically connected to the battery 30, the ECU 50, and the charging device 60. The ECU 50 is electrically connected to the MG 20, the BMU 31, the converter 40, and the charging device 60. The BMU 31 is electrically connected to the battery 30.

For example, the ECU 50 and the converter 40 serve as a charge control apparatus.

The MG 20 is comprised of, for example, a three-phase alternating-current (AC) motor, which is referred to simply as a motor, 21 and an inverter 22, which serves as, for example, a power converter. That is, the MG 20 is designed as a mechatronical rotary electric machine. The motor 21 of the MG 20 includes a rotating shaft mechanically coupled to a driving axle of the vehicle 10 via a gear mechanism, such as a transmission, of the vehicle 10; the driving having at both ends driving wheels.

That is, the motor 21 of the MG 20 operates in a power running mode to generate torque, i.e. rotational power, that rotatably drives the driving axle to thereby rotatably drive the driving wheels via the gear mechanism.

The motor 21 of the MG 20 also operates in a regenerative mode to generate electrical power based on torque transferred from the driving axle, i.e. kinetic energy of the vehicle 10.

Specifically, the motor 21 is electrically connected to the battery 30 via the inverter 22 and the converter 40. The motor 21 can be electrically connected to the battery 30 via the inverter 22.

That is, the ECU 50 is configured to instruct the inverter 22 to instruct the converter 40 to convert a DC terminal voltage of the battery 30 into an adjusted voltage, and instruct the inverter 22 to convert DC power with the adjusted DC voltage into AC power, thus supplying the AC power to the motor 21. This causes the motor 21 to operate in the power running mode, thus supplying torque to the driving axle of the vehicle 10.

Additionally, the ECU 50 is configured to instruct the inverter 22 to cause the motor 21 to operate in the regenerative mode to generate electrical power, thus supplying generated electrical power to the battery 30 via the converter 40.

The battery 30 is, for example, a nickel-hydrogen battery or a lithium-ion battery. The battery 30 can be comprised of a battery pack that includes a plurality of cells that are connected in series.

Referring to FIG. 2, each cell of the battery 30 has a predetermined upper limit of an allowable charging-voltage range, which is set to, for example, 4.2 V, so that a predetermined upper limit of an allowable charging-voltage range for the whole of the battery 30 is set to, for example, 800 V. The upper limit of the allowable charging-voltage range for the battery 30 will also be referred to as a maximum charging voltage.

Additionally, each cell of the battery 30 has a predetermined upper limit of an allowable charging-current range, which is set to, for example, 500 A although the upper limit of the allowable charging-current range for the corresponding cell can vary depending on the state of charge (SOC) of the corresponding cell. The upper limit of the allowable charging-current range for the battery 30 will also be referred to as a maximum charging current.

The above maximum charging voltage and current result in a predetermined upper limit of an allowable charging-power range for the whole of the battery 30 being set to, for example, 400 kW.

Note that each of the upper limits set forth above can be changed depending on various conditions of the battery 30, which include the degree of its performance deterioration, the temperature of the battery 30 or therearound, the humidity around the battery 30, the ambient air pressure around the battery 30, and/or the other similar condition parameters.

The BMU 31 connected to the battery 30 monitors the terminal voltage across the battery 30, and outputs the terminal voltage across the battery 30 to the ECU 50. Note that a voltage sensor VS can be provided to measure the terminal voltage across the battery 30, and output the terminal voltage across the battery 30 to the ECU 50.

Additionally, the BMU 31 monitors the conditions of the battery 30 to thereby obtain information about the monitored conditions of the battery 30; the information will be referred to as condition information about the battery 30. The conditions of the battery 30 include, for example, the SOC of the battery 30 and at least one environment parameter indicative of a surrounding environment of the battery 30; the at least one environment parameter of the battery 30 includes, for example, the temperature of the battery 30 or therearound, the humidity around the battery 30, and/or the ambient air pressure around the battery 30.

The BMU 31 outputs the condition information about the battery 30 to the ECU 50. Note that the ECU 50 can include all the functions of the BMU 31, so that the BMU 31 can be omitted.

The converter 40 is configured as a direct-current (DC)-DC converter for converting a DC voltage, i.e. a DC battery voltage, of electrical power supplied from the battery 30 into a DC output voltage whose level is suitable for the MG 20 and is different from a level of the battery voltage, and sends the DC output voltage to the MG 20.

As described above, the inverter 22 converts an alternating-current (AC) voltage of AC power generated by the MG 20 into a DC voltage of DC power, and the converter 40 is configured to convert the DC voltage input from the inverter 22 into a charge DC voltage whose level is suitable for the battery 30 and is different from a level of the DC voltage input to the converter 40. Then, the converter 40 sends the charge DC voltage to the battery 30.

In particular, the converter 40 is capable of stepping up or stepping down a DC voltage input from the battery 30 or the inverter 22. That is, the converter 40 is configured to (1) Stepping up or stepping down a level of an input DC voltage input from the battery 30 or the inverter 22 into a level of an output DC voltage in accordance with an instruction sent from the ECU 50

(2) Send the output DC voltage to the battery 30 or the MG 20; the level of the output voltage, for example, can be suitable for the battery 30

Note that the voltage conversion operation of the converter 40 results in consumption of electrical power, i.e. results in power loss, due to, for example, heat generated by the power conversion operation. For example, usual voltage conversion devices have a voltage conversion efficiency within the range from approximately 80% to 95%, which is defined by the percentage of an output voltage to an input voltage. For example, the converter 40 of the first embodiment has the voltage conversion efficiency of 90%.

The ECU 50 is comprised of, for example, a processing unit, such as a central processing unit (CPU) 50a, a memory unit 50b including, for example, a ROM, a RAM, and a flash memory, and at least one peripheral unit. The ECU 50 can be comprised of another type of processing unit, such as an application specific integrated circuit (ASIC).

Note that various sensors SS are installed in the vehicle 10, and are electrically connected to the ECU 50. The various sensors SS include, for example, driver-operable sensors for measuring information about driver's operations of driver-operable devices, such as an accelerator pedal and a brake pedal of the vehicle 10, and vehicle-condition sensors for measuring information about the travelling conditions of the vehicle 10.

For example, as the driver-operable sensors, an accelerator sensor and a brake sensor are installed in the vehicle 10. The accelerator sensor measures an amount of the driver's operation of the accelerator pedal of the vehicle 10, and outputs, to the ECU 50, measurement information indicative of the measured amount of the driver's operation of the accelerator pedal each time the accelerator pedal is operated by a driver. The brake sensor measures an amount of the driver's operation of the brake pedal of the vehicle 10, and outputs, to the ECU 50, measurement information indicative of the measured amount of the driver's operation of the brake pedal. The vehicle-condition sensors include, for example, a vehicle speed sensor repeatedly measures the speed of the vehicle 10, and repeatedly outputs, to the ECU 50, measurement information indicative of the speed of the vehicle 10. The ECU 50 receives the driver's operation information and the vehicle-condition information sent from the sensors SS.

Additionally, the ECU 50 receives, from the BMU 31, the condition information about the battery 30, and receives, from the MG 20, operating information about the MG 20, which includes, for example, a rotational speed of the motor 21 of the MG 20, and a rotational angle of the motor 21 each time of rotation of the motor 21.

The ECU 10 is configured to perform various functions based on the various information items received from the sensors SS, the battery 30, the BMU 31, and the MG 20.

For example, various programs for causing the CPU 50a of the ECU 50 to perform the various functions, i.e. various routines, are stored in the memory unit 50b of the ECU 50. In addition, various data items usable by the CPU 50a of the ECU 50 are also stored in the memory unit 50b of the ECU 50. The CPU 50a of the ECU 50 reads at least one of the various programs from the memory unit 50b, and executes the at least one program to thereby execute the function corresponding to the at least one readout program.

Note that at least part of all functions provided by the ECU 50 can be implemented by at least one processor; the at least one processor can be comprised of (1) The combination of at least one programmed processing unit, i.e. at least one programmed logic circuit, and at least one memory including software that causes the at least one programed logic circuit to implement all the functions (2) At least one hardwired logic circuit that implements all the functions (3) At least one hardwired-logic and programmed-logic hybrid circuit that implements all the functions For example, the CPU 50*a* of the ECU 50 performs the function, i.e. the routine, of controlling, via the inverter 22, the motor 21 to thereby cause the motor 21 to operate in the power running mode, and also performs the function, i.e. the routine, of controlling, via the inverter 22, the motor 21 to thereby cause the motor 21 to operate in the regenerative mode.

Additionally, the vehicle 10 is configured such that the battery 30 is chargeable based on electrical power supplied from the charging device 60 located outside the vehicle 10.

The charging device 60 includes a power supply adapter 61, a control unit 62, and a power supply unit 63 having the positive and negative terminals. The vehicle 10 has a connection terminal to which the converter 40 is electrically connected. To the connection terminal of the vehicle 10, the power supply adapter 61, which is connected to the positive and negative terminals of the power-supply unit 63, is connected. This enables the power supply unit 63 to supply electrical power to the converter 40 via the power supply adapter 61 and the connection terminal T.

For example, the power-supply unit 63 of the charging device 60 is, for example, a constant-voltage (CV) and constant-current (CC) power supply unit, which is therefore capable of outputting (1) Electrical power based on a constant voltage (2) Electrical power based on a constant current (3) Electrical power based on a constant voltage and a constant current Specifically, referring to FIG. 2, the charging device 60 of the first embodiment has a predetermined upper limit of an allowable output voltage range; the upper limit is set to, for example, 1000 V. The upper limit of the allowable output voltage range of the charging device 60 will also be referred to as, for example, a maximum output voltage of the charging device 60.

Additionally, the charging device 60 has a predetermined upper limit of an allowable output current range; the upper limit is set to, for example, 350 A. The upper limit of the allowable output current range of the charging device 60 will also be referred to as, for example, a maximum output current of the charging device 60.

The upper limit of 1000 V of the allowable output voltage range and the upper limit of 350 A of the allowable output current range result in a predetermined upper limit, i.e. maximum output power, of an allowable output power range of the charging device 60 being set to, for example, 350 kW.

The control unit 62 of the charging device 63 is comprised of, for example, a processing unit, such as a central processing unit (CPU) 62*a*, a memory unit 62*b* including, for example, a ROM, a RAM, and a flash memory, and at least one peripheral unit. The control unit 62 can be comprised of another type of processing unit, such as an application specific integrated circuit (ASIC).

The control unit 62 is configured to adjust a voltage and/or a current supplied from the power supply unit 63 to the vehicle 10, and is configured to be communicable with the ECU 50 of the vehicle 10.

When the charging device 60 carries out the charging task of the battery 30 constant-current (CC) charging or constant-voltage (CV) charging, the ECU 50 is capable of instructing the CPU 62*a* of the control unit 62 to control the level of a constant voltage and/or the level of a constant current supplied from the power supply unit 63 such that the level of the constant voltage and/or the level of the constant current are maintained within the respective allowable charging-voltage range and the allowable charging-current range.

For example, even if the maximum output voltage of 1000 V of the charging device 60 is higher than the upper limit, which is set to 800 V, of the allowable charging-voltage range for the battery 30, a voltage to be actually supplied from the charging device 60 to the battery 30 based on the CC charging mode or CV charging mode is limited to be within the allowable charging-voltage range for the battery 30. This results in supply power to be outputted from the charging device 60 based on the CC charging mode or CV charging mode being limited as compared with the upper limit, which is set to 350 kW, of the allowable output power range of the charging device 60.

That is, charging, based on the CC charging mode or CV charging mode, the battery 30 using the supply power whose supply voltage is restricted based on the upper limit of the allowable charging-voltage range for the battery 30 may make it difficult to take full advantage of the charging capability of the charging device 60. This may leave room for shorter charging time of the battery 30.

From this viewpoint, the charge control system 100 and the ECU 50, which serves as a charge control apparatus, are specially configured described below in order to, for example, shorten charging time of the battery 30, i.e. charge the battery more rapidly.

The converter 40 is configured to receive supply power sent from the charging device 60 via the power supply adapter 61 and the connection terminal T. The converter 40 is capable of converting an input voltage, i.e. an input DC voltage, of the supply power sent from the charging device 60 into a DC output voltage whose level is suitable for the battery 30 and is different from a level of the input DC voltage input to the converter 40. Then, the converter 40 is capable of outputting electrical power based on the converted DC output voltage to the battery 30 as charge power, thus charging the battery 30.

The ECU 50 functionally includes a voltage conversion instructor 51 and a supply power requestor 52.

The voltage conversion instructor 51 is configured to instruct, for rapid charging of the battery 30 described later, the converter 40 to convert supply power outputted from the charging device 60 and input thereto into charging supply power such that a voltage and a current of the charging supply power, which will be referred to respectively as a charging voltage and a charging current, obtained by the converter 40 are within the respective charging-voltage range and charging-current range for the battery 30.

Note that the charging voltage for charging the battery 30 is required to be at least higher than the terminal voltage across the battery 30. For this reason, the voltage conversion instructor 51 of the first embodiment can be configured to instruct the converter 40 to convert the voltage of the supply power outputted from the charging device 40 and input thereto into the charging voltage such that the charging voltage matches the upper limit of the charging-voltage range for the battery 30.

Note that the upper limit of the charging-voltage range for the battery 30 may vary depending on the conditions of the battery 30. From this viewpoint, the memory unit 50b includes an upper limit map M1 in data-table format, in mathematical expression format, and/or program format stored in, for example, the memory unit 50b. For example, the upper limit map M1 includes information indicative of a relationship among (1) Each of values of the upper limit of the charging-voltage range for the battery 30

(2) A corresponding value of the SOC of the battery 30

(3) A corresponding value of the at least one environment parameter indicative of at least one of the temperature of the battery 30 or thereabout, the humidity around the battery 30, the ambient air pressure around the battery 30, or the degree of the performance deterioration of the battery 30

That is, the voltage conversion instructor 51 can refer to the upper limit map M1 using a value of the SOC of the battery 30 and a value of the at least one environment parameter to thereby extract, from the upper limit map M1, a value of the upper limit of the charging-voltage range for the battery 30, which corresponds to the value of the SOC of the battery 30 and the value of the at least one environment parameter.

The upper limit map M1 can include information indicative of a relationship among (1) Each of values of the upper limit of the charging-voltage range for the battery 30

(2) A corresponding value of the at least one environment parameter indicative of at least one of the temperature of the battery 30 or thereabout, the humidity around the battery 30, the ambient air pressure around the battery 30, or the degree of the performance deterioration of the battery 30

That is, the voltage conversion instructor 51 can refer to the upper limit map M1 using a value of the at least one environment parameter to thereby extract, from the upper limit map M1, a value of the upper limit of the charging-voltage range for the battery 30, which corresponds to the value of the at least one environment parameter.

The voltage conversion instructor 51 of the first embodiment can be configured to instruct the converter 40 to convert the voltage of the electrical power supplied from the charging device 60 and input thereto into the target voltage that does not match with the upper limit of the charging-voltage range for the battery 30 but is equal to or higher than the terminal voltage across the battery 30.

The supply power requestor 52 is configured to determine whether the terminal voltage across the battery 30 is lower than a predetermined threshold voltage, and permit the charging device 60 to perform the rapid charging of the battery 30, which will be described later, upon determining that the terminal voltage across the battery 30 is lower than the predetermined threshold voltage.

When instructing the charging device 60 to perform the rapid charging of the battery 30, the supply power requestor 52 requests the charging device 60 to output, to the converter 40, supply power having a constant voltage and a constant current while the supply power is within the allowable charging-power range for the battery 30 and the constant voltage of the supplied electrical power is higher than the allowable charging-voltage range for the battery 30.

In particular, when instructing the charging device 60 to perform the rapid charging of the battery 30, the supply power requestor 52 of the first embodiment requests the charging device 60 to output, to the converter 40, supply power corresponding to the upper limit of the allowable charging-power range for the battery 30.

Specifically, when instructing the charging device 60 to perform the rapid charging of the battery 30, the supply power requestor 52 outputs, to the charging device 60, a request signal that requests the charging device 60 to output, to the converter 40, supply power based on 1000 V and 350 A. When receiving the request signal, the control unit 62 of the charging device 60 controls the power supply unit 63 to output, to the vehicle 10, i.e. the converter 40, supply power that satisfies the request signal.

Note that charging of the battery 30 based on supply power that has a constant current and a constant voltage higher than the allowable charging-voltage range for the battery 30 while the supply power is maintained within the allowable charging-power range for the battery 30 is defined as rapid charging of the battery 30. Additionally, note that the threshold voltage can be set to any value as long as the set value of the threshold voltage is equal to or lower than the upper limit of the allowable charging-voltage range for the battery 30.

Additionally, the supply power requestor 52 is configured to request the charging device 60 to perform the CV charging mode to thereby output, to the converter 40, supply power having a constant voltage while the supply power is within the allowable charging-power range for the battery 30.

Specifically, the supply power requestor 52 requests the charging device 60 to perform the CV charging mode to thereby output, to the converter 40, supply power having the constant voltage corresponding to the upper limit of the allowable charging-voltage range for the battery 30.

Note that the upper limit of the charging-voltage range for the battery 30 can be changed based on the upper limit map M1 described above.

While the battery 30 is charged based on the CV charging mode, a current output from the charging device 60 may vary depending on the terminal voltage across the battery 30 or the SOC of the battery 30. More specifically, while the battery 30 is charged based on the CV charging, a current output from the charging device 60 may decrease with an increase of the terminal voltage across the battery 30 or the SOC of the battery 30. Note that a current output from the charging device 60 is maintained within the allowable charging-current range for the battery 30.

Supply power outputted from the charging device 60 is higher than power discharged from the battery 30 and input to the converter 40, and also higher than power generated by the MG 20 and input to the converter 40. This results in longer time required for completion of power supply to the converter 40. If the converter 40 were designed for voltage conversion between only the battery 30 and the MG 20, the cooling capacity of the converter 40 would be insufficient for cooling heat generated from the converter 40. This would result in a malfunction occurring in the converter 40 due to the generated heat. Additionally, there is not necessarily a need to charge the battery 30 using the upper limit of the allowable charging-power range.

From this viewpoint, the supply power requestor 52 is configured to select, in accordance with at least one selection condition, one of a first charging mode and a second charging mode upon determining that the terminal voltage across the battery 30 is lower than the threshold voltage. The first charging mode requests the charging device 60 to output the supply power with the voltage higher than the allowable charging-voltage range for the battery 30 within a predetermined first charging period.

The first charging mode requests the charging device 60 to output supply power with a voltage higher than the allowable charging-voltage range for the battery 30 during a predetermined first charging period. In contrast, the second charging mode requests the charging device 60 to output supply power with a constant current that is within the allowable charging-current range for the battery 30 during a predetermined second charging period.

That is, the supply power requestor 52 is configured to select one of the first charging mode that requests the charging device 60 to perform the rapid charging of the battery 30 during the first charging period, and the second charging mode that requests the charging device 60 to operate in the CC charging mode within the second charging period.

When selecting the second charging mode, the supply power requestor 52 requests the charging device 60 to continuously output supply power with the maximum output current of 350 A during the second charging period while the maximum output current of 350 A is within the allowable charging-current range for the battery 30.

Note that, if the maximum output current of the charging device 60 is higher than the upper limit of the allowable charging-current range for the battery 30, the supply power requestor 52 requests the charging device 60 to output a constant current within the allowable charging-current range for the battery 30.

In particular, the voltage conversion instructor 51 instructs the converter 40 not to perform a voltage conversion operation, so that the voltage of the supply power outputted from the charging device 60 and inputted to the converter 40 is outputted from the converter 40 to, for example, the battery 30 without being processed by the converter 40. This prevents the converter 40 from performing the voltage conversion operation during the second charging period, thus preventing heat from being generated from the converter 40. This therefore enables the converter 40 to be cooled during the second charging period.

Note that the voltage of the supply power outputted from the charging device 60 based on the second charging mode varies depending on the terminal voltage across the battery 30. This results in, even for non-conversion of the voltage of the supply power outputted from the discharging device 60, no issues due to non-conversion of the voltage of the supply power. This therefore prevents the charging voltage for the battery 30 from increasing over the upper limit of the allowable charging-voltage range.

Next, the following describes how the supply power requestor 52 selects one of the first charging mode and the second charging mode in accordance with the at least one selection condition.

The at least one selection condition according to the first embodiment can include a temperature condition of the converter 40.

Specifically, a temperature sensor TS is provided in the vehicle 10 for measuring the temperature of the converter 40, and for outputting, to the ECU 50, a measurement signal indicative of the temperature of the converter 40.

That is, the supply power requestor 52 is configured to periodically determine whether the temperature of the converter 40 obtained based on the measurement signal received from the temperature sensor TS. Upon determining that the temperature of the converter 40 is equal to or higher than a predetermined temperature threshold, the supply power requestor 52 continuously is configured to (1) Continuously perform the second charging mode while having selected the second charging mode (2) Switch the charging mode for the battery 30 from the first charging mode to the second charging mode while having selected the first charging mode Note that the temperature threshold is preferably set to be lower than temperatures at which the converter 40 is likely to be malfunctioned.

The at least one selection condition according to the first embodiment can be a condition whether CC-charging situation information indicative of a situation where the rapid charging is required is stored in, for example, the memory unit 50b. That is, if the CC-charging situation information representing that there is a situation where the CC charging mode is required, i.e. where the rapid charging is not required, is stored in the memory unit 50b, the supply power requestor 52 is configured to (1) Continuously perform the second charging mode while having selected the second charging mode (2) Switch the charging mode for the battery 30 from the first charging mode to the second charging mode while having selected the first charging mode Note that the CPU 50a of the ECU 50 can store, in the memory unit 50b as an example, the CC-charging situation information when an input device ID, such as a driver-operable switch, which is previously provided to the vehicle 10, is operated by a driver of the vehicle 10 so that the CC-charging situation information is inputted to the CPU 50a.

As another example, let the vehicle 10 be configured as an autonomous vehicle in which an autonomous driving system ADS for autonomous driving of the vehicle 10 in accordance with a previously determined autonomous driving schedule. At that time, the CPU 50a of the vehicle 10 can store, in the memory unit 50b as an example, the CC-charging situation information when no autonomous driving schedule has been determined for a predetermined period.

In contrast, if the temperature of the converter 40 is lower than the temperature threshold, and no CC-charging situation information is stored in the memory unit 50b, the supply power requestor 52 is configured to (1) Continuously perform the first charging mode while having selected the first charging mode (2) Switch the charging mode for the battery 30 from the second charging mode to the first charging mode while having selected the second charging mode Note that the at least one selection condition can be freely changed. For example, the supply power requester 52 can be configured to switch the charging mode for the battery 30 from one of the first and second charging modes to the other thereof in accordance with a charging time and/or the amount of charge in the battery 30 as the at least one selection condition.

Specifically, the supply power requester 52 can be configured to alternately select one of the first and second charging modes each time a predetermined time, i.e. a predetermined charging time, has elapsed or each time a predetermined amount of charge is stored in the battery 30.

Next, the following describes a charging control routine carried out by the ECU 50, i.e. the CPU 50a thereof, in accordance with instructions of a corresponding at least one program stored in the memory unit 50b with reference to the flowchart of FIG. 3. Note that the ECU 50 carries out the charging control routine every predetermined period while the charging device 60 is communicably connected to the vehicle 10 via, for example, the power supply adapter 61 and the connection terminal T.

When starting the charging control routine, the ECU 50 serves as, for example, the supply power requestor 52 to determine whether a present value of the SOC of the battery 30, which is obtained from the BMU 31, is equal to or higher than a target SOC in step S100. For example, the memory unit 50b includes a target SOC map M2 in data-table format, in mathematical expression format, and/or program format stored in, for example, the memory unit 50b. For example, the target SOC map M2 includes information indicative of a relationship among (1) Each of values of the target SOC of the battery 30

(2) A corresponding value of the at least one environment parameter indicative of at least one of the temperature of the battery 30 or thereabouts, the humidity around the battery 30, the ambient air pressure around the battery 30, or the degree of the performance deterioration of the battery 30

That is, the ECU 50 can refer to the target SOC map M2 using a value of the at least one environment parameter to thereby extract, from the target SOC map M2, a value of the target SOC of the battery 30, which corresponds to the value of the at least one environment parameter. Then, the ECU 50 determines whether the present value of the SOC of the battery 30 is equal to or higher than the value of the target SOC in step S100.

Upon determining that the present value of the SOC of the battery 30 is equal to or higher than the value of the target SOC (YES in step S100), the ECU 50 terminates the charging control routine.

Otherwise, upon determining that the present value of the SOC of the battery 30 is lower than the value of the target SOC (NO in step S100), the ECU 50 serves as, for example, the supply power requestor 52 to determine whether the terminal voltage across the battery 30, which is obtained from, for example, the BMU 31, is lower than the threshold voltage in step S101.

Upon determining that the terminal voltage across the battery 30 is lower than the threshold voltage (YES in step S101), the ECU 50 serves as, for example, the supply power requestor 52 to determine whether the temperature of the converter 40, which is obtained from the temperature sensor TS, is lower than the predetermined temperature threshold in step S102.

Upon determining that the temperature of the converter 40 is lower than the predetermined temperature threshold (YES in step S102), the ECU 50 serves as, for example, the supply power requestor 52 to determine whether the CC-charging situation information is stored in the memory unit 50b in step S103.

Upon determining that the CC-charging situation information is not stored in the memory unit 50b (NO in step S103), the ECU 50 serves as, for example, the supply power requestor 52 to request the charging device 60 to perform the rapid charging of the battery 30 in step S104.

Specifically, the ECU 50 serves as the supply power requestor 52 to request the charging device 60 to output, to the converter 40, supply power having a constant voltage and a constant current while the supply power is within the allowable charging-power range for the battery 30 and the constant voltage of the supplied electrical power is higher than the allowable charging-voltage range for the battery 30 in step S104. In particular, the ECU 50 of the first embodiment serves as the supply power requestor 52 to request the charging device 60 to output, to the converter 40, the maximum output power of the allowable charging-power range for the battery 30 in step S104 (see "PERFORM RAPID CHARGING WITH MAXIMUM OUTPUT POWER" in step S104 of FIG. 3).

Specifically, the ECU 50 of the first embodiment serves as the supply power requestor 52 to select the first charging mode with the first charging period, thus requesting the charging device 60 to perform the rapid charging of the battery 30 in the first charging mode. This results in the control unit 62 instructing the power supply unit 63 to output the maximum output power of the allowable charging-power range for the battery 30 during the first charging period in step S104.

Following the operation in step S104, the ECU 50 serves as, for example, the voltage conversion instructor 51 to instruct the converter 40 to convert the voltage of the supply power, i.e. the maximum output power, outputted from the charging device 60 into a charging voltage such that the charging voltage and a charging current of converted supply power obtained by the converter 40 are within the respective charging-voltage range and charging-current range for the battery 30 in step S105. This results in the converted supply power, i.e. charging supply power, being supplied to the battery 30, thus charging the battery 30. After the operation in step S104, the ECU 50 terminates the charging control routine.

Otherwise, upon determining that the temperature of the converter 40 is equal to or higher than the predetermined temperature threshold (NO in step S102) or determining that the CC-charging situation information is stored in the memory unit 50b (YES in step S103), the ECU 50 determines that the CC-charging mode is requested. Then, the ECU 50 serves as the supply power requestor 52 to request the charging device 60 to output, in the second charging mode, supply power with a constant current that is within the allowable charging-current range for the battery 30 during the predetermined second charging period in step S106.

Specifically, the ECU 50 of the first embodiment serves as the supply power requestor 52 to select the second charging mode with the second charging period, thus requesting the charging device 60 to perform the CC charging mode. This results in the control unit 62 instructing the power supply unit 63 to output supply power with the maximum output current of 350 A within the allowable charging-current range for the battery 30 during the second charging period in step S106.

This results in the supply power with the maximum output current of 350 A being supplied via the converter 40 to the battery 30 without voltage conversion by the converter 40, thus charging the battery 30. After the operation in step S106, the ECU 50 terminates the charging control routine.

On the other hand, upon determining that the terminal voltage across the battery 30 is equal to or higher than the threshold voltage (NO in step S101), the ECU 50 serves as, for example, the supply power requestor 52 to request the charging device 60 to perform the charging device 60 to perform the CV charging mode to thereby output supply power with a constant voltage that is within the allowable charging-voltage range for the battery 30 in step S107. That is, because the upper limit of the output voltage range of the charging device 60 is higher than the upper limit of the allowable charging-voltage range for the battery 30, the charging voltage 60 is requested to output supply power with a constant voltage that is equal to the upper limit of the allowable charging-voltage range for the battery 30.

This results in the control unit 62 instructing the power supply unit 63 to output the supply power with the constant voltage equal to the upper limit of the allowable charging-voltage range for the battery 30. This results in the supply power with the constant voltage being supplied via the converter 40 to the battery 30 without voltage conversion by the converter 40, thus charging the battery 30. After the operation in step S107, the ECU 50 terminates the charging control routine.

Figure 4:
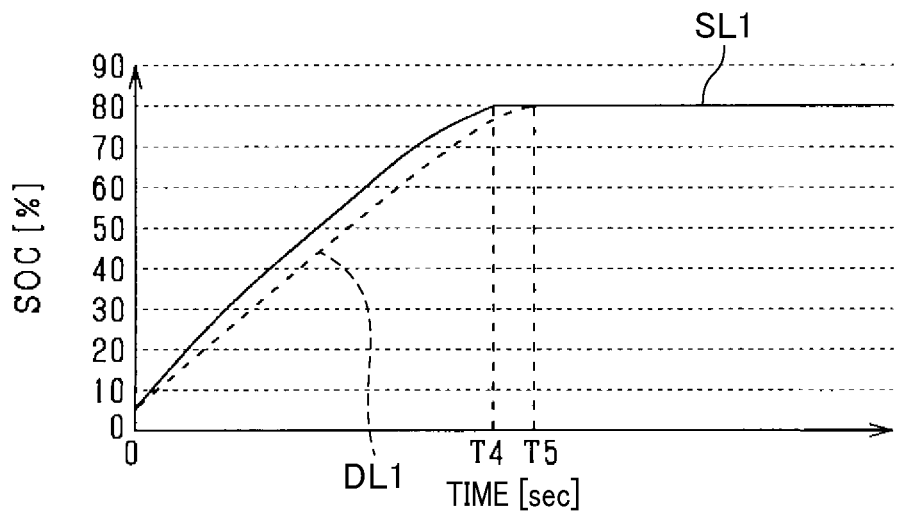
FIG. 4 is a graph schematically illustrating how an SOC of the battery is changed over time during execution of rapid charging of the battery according to the first embodiment.
Figure 5:
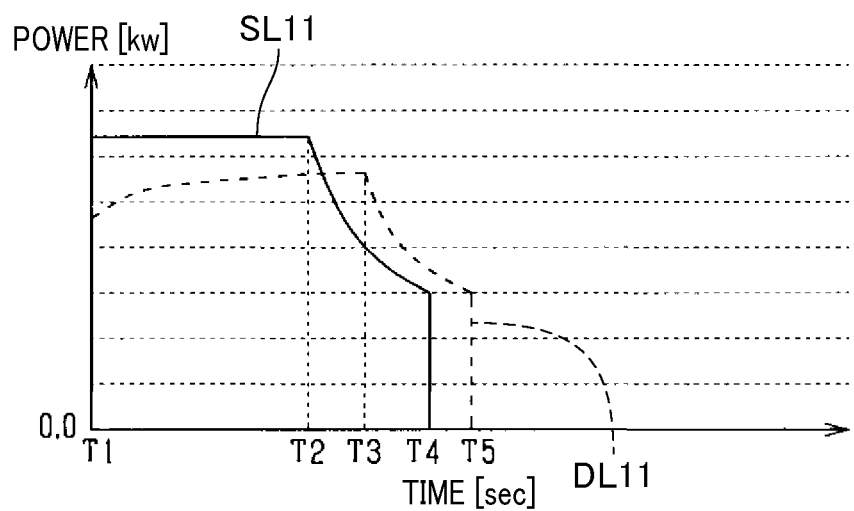
FIG. 5 is a graph schematically illustrating how charging supply power for the battery is changed over time during execution of rapid charging of the battery according to the first embodiment.
Figure 6:
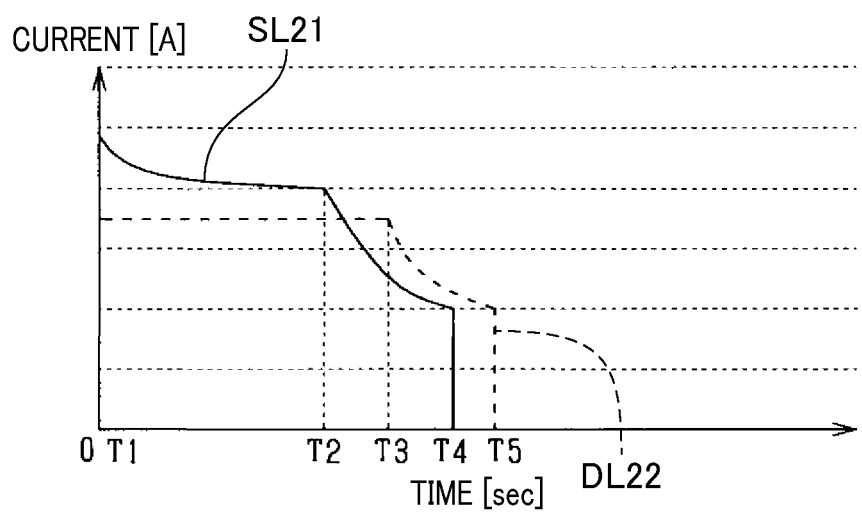
FIG. 6 is a graph schematically illustrating how a charging current for the battery is changed over time during execution of rapid charging of the battery according to the first embodiment.

Next, the following describes how the SOC of the battery 30, the charging supply power for the battery 30, and the charging current are changed over time during execution of the rapid charging of the battery 30 with reference to respective FIGS. 4 to 6. Specifically, FIG. 4 plots the SOC of the battery 30 according to the first embodiment using the solid line SL1, and plots the SOC of the battery 30 according a comparative example, which charges the battery 30 based on the CC-CV charging mode, using the dashed line DL1. Similarly, FIG. 5 plots the charging supply power for the battery 30 according to the first embodiment using the solid line SL11, and plots the charging supply power for the battery 30 according the comparative example using the dashed line DL11. Additionally, FIG. 6 plots the charging current according to the first embodiment using the solid line SL21, and plots the charging current according the comparative example using the dashed line DL21.

Note that, as illustrated in FIG. 4, the results of the rapid charging of the battery 30 illustrated in FIGS. 4 to 6 for each of the first embodiment and the comparative example were obtained assuming that (1) The SOC of the battery 30 at the start of the rapid charging of the battery 30 was set to several percent (2) The CC charging mode in the second charging mode, was not carried out FIG. 5 shows that, for the rapid charging of the battery 30 according to the first embodiment, the maximum output power of the charging device 60 is constantly supplied to the battery 30 during a period from time T1 at the start of the rapid charging to time T2 at which the terminal voltage across the battery 30 has reached the threshold voltage; this period is expressed as T1 to T2.

In contrast, FIG. 5 shows that, for the CC-CV charging mode of the comparative example, constant-current charging of the battery 30 is carried out during a period from the time T1 at the start of the constant-current charging to time T3 at which the terminal voltage across the battery 30 has reached the threshold voltage. As described above, the supply power outputted to the battery 30 in the CC-CV charging mode varies depending on the terminal voltage across the battery 30, so that the voltage that is lower than the upper limit of the allowable charging-voltage range for the battery 30 may be outputted from the charging device 60.

This therefore results in the level of the supply power outputted to the battery 30 based on the rapid charging being higher than the level of the supply power outputted to the battery 30 based on the CC-CV charging mode. This also results in time required for the terminal voltage across the battery 30 to have reached the threshold voltage according to the first embodiment being faster than time required for the terminal voltage across the battery 30 to have reached the threshold voltage according to the comparative example.

Note that, as illustrated in FIG. 6, for the rapid charging of the battery 30, the charging current for the battery 30 gradually decreases in inverse proportion to an increase of the terminal voltage across the battery 30 during the period from the time T1 to the time T2. Because the supply power outputted to the battery 30 during the period from the time T1 to the time T2 is constant, the charging voltage for the battery 30 gradually increases in inverse proportion to the charging current for the battery 30. In contrast, as illustrated in FIG. 6, for the CC-CV charging mode of the battery 30, the charging current for the battery 30 is kept constant during the period from the time T1 to the time T2.

After the terminal voltage across the battery 30 has reached the threshold voltage at the time T2 according to the first embodiment, the battery 30 is charged based on the CV charging mode. Similarly, after the terminal voltage across the battery 30 has reached the threshold voltage at the time T3 according to the comparative example, the battery 30 is charged based on the CV charging mode. This results in the charging current flowing through the battery 30 gradually decreasing depending on the terminal voltage across the battery 30 in each of the first embodiment and the comparative example, resulting in the charging supply power for the battery 30 therefore decreasing depending on the terminal voltage across the battery 30 in each of the first embodiment and the comparative example.

Thereafter, when the terminal voltage across the battery 30 has reached the target SOC of the battery 30 at time T4, which is set to 80% relative to its full charge of 100% in FIGS. 4 to 6, charging of the battery 30 based on the CV charging mode is terminated for the first embodiment. Similarly, when the terminal voltage across the battery 30 has reached the target SOC of the battery 30 at time T5, which is set to 80% relative to its full charge of 100% in FIGS. 4 to 6, charging of the battery 30 based on the CV charging mode is terminated for the comparative example. FIG. 4 clearly shows that the charging time required for the SOC of the battery 30 to have reached 80% for the rapid charging according to the first embodiment is shorter than the charging time required for the SOC of the battery 30 to have reached 80% for the CC-CV charging mode according to the comparative example.

As described in detail above, the ECU 50 according to the first embodiment is configured to request, for the rapid charging of the battery 30, the charging voltage 60 to output supply power with a constant voltage and a constant current for the rapid charging of the battery 30 such that (1) The supply power is within the allowable charging-power range for the battery 30

(2) The constant voltage of the supply power is higher than the allowable charging-voltage range for the battery 30

Specifically, the ECU 50 is configured to request the charging device 60 to output the maximum output power corresponding to the upper limit of the allowable output power range of the charging device 60. Because the maximum output power of the charging device 60 is within the allowable charging-power range for the battery 30, the voltage or current of the maximum output power is free from the allowable charging-voltage range or allowable charging-current range for the battery 30. This configuration therefore enables the charging voltage or the charging current for the battery 30 to increase, thus increasing the supply voltage to be outputted to the battery 30. That is, this configuration enables the upper limit of the allowable charging-power range for the battery 30 to be supplied to the battery 30, results in minimization of the charging time of the battery 30.

Additionally, the ECU 50 according to the first embodiment is configured to cause the converter 40 to convert the voltage of the supply power outputted from the charging device 60 into a charging voltage such that the charging voltage and a charging current of converted supply power obtained by the converter 40 are within the respective charging-voltage range and charging-current range for the battery 30. This therefore prevents an excessively high charging and/or an excessively high charging current from being supplied to the battery 30.

If the terminal voltage across the battery 30 is lower than the threshold voltage, a larger level of charging current can be supplied to the battery 30 than a level of charging current otherwise.

From this viewpoint, the ECU 50 is configured to request the charging device 60 to output supply power based on a voltage higher than the allowable charging-voltage range for the battery 30. This configuration results in the charging time of the battery 30 being shorter than the charging time of the battery 30 for the case where the battery 30 is charged based on the charging voltage being within the charging-voltage range for the battery 30.

Otherwise, if the terminal voltage across the battery 30 is equal to or higher than the threshold voltage, the ECU 50 is configured to request the charging device 60 to output supply voltage with a constant voltage that is within the allowable charging-voltage range. In other words, the ECU 50 requests the charging device 60 to shift the charging of the battery 30 from the rapid charging to the CV charging mode. This configuration therefore enables the battery 30 to be reliably charged to the target SOC while preventing overcurrent flowing to the battery 30 and overcharging of the battery 30.

The ECU 50 is configured to switch the charging mode for the battery 30 from one of the first and second charging modes to the other thereof. The first charging mode requests the charging device 60 to output the supply power with the voltage higher than the allowable charging-voltage range for the battery 30 within the first charging period, and the second charging mode requests the charging device 60 to output supply power with a constant current that is within the allowable charging-current range for the battery 30 during the second charging period.

In particular, the ECU 50 is configured to instruct the converter 40 not to convert the voltage of the supply power outputted from the charging device 60 while setting the charging mode for the battery 30 to the second charging mode. In particular, the ECU 50 is configured to select one of the first charging mode and the second charging mode in accordance with the at least one selection condition; the at least one condition includes the temperature condition of the converter 40.

That is, the ECU 50 is configured to select the second charging mode upon determining that the temperature of the converter 40 is equal to or higher than the temperature threshold.

This configuration enables the rapid charging of the battery 30, i.e. charging of the battery 30 in the first charging mode, to be interrupted when determining that there is a high possibility of a malfunction or a failure having occurred in the converter 40 due to the temperature of the converter 40. This enables the converter 40 to be cooled, making it possible to reduce the initial cooling capability of the converter 40 to a minimum.

Additionally, the ECU 30 is configured to select the second charging mode upon determining that the CC-charging situation information is stored in the memory unit 50b so that it is unnecessary for performing the rapid charging of the battery 30.

This configuration enables the rapid charging of the battery 30 to be carried out only when it is necessary for performing the rapid charging of the battery 30, making it possible to reduce energy loss due to execution of the voltage conversion by the converter 40.

The vehicle 10 incudes the MG 20 driven based on power supplied from the battery 30, and the converter 40 for converting an output voltage of the battery 30 into a target voltage to be supplied to the MG 20. The ECU 50 causes the converter 40 to serve as a DC-DC voltage converter when the vehicle 10 is communicably connected to the charging device 60. This configuration therefore eliminates the need of providing an additional converter for converting a voltage outputted from the charging device 60 into an adjusted voltage in addition to the converter 40 for voltage conversion between the battery 30 and the MG 20.

Partial discharge may occur in the battery 30 while a charging voltage, which is higher than a partial-discharge threshold, is applied to the battery 30. The partial-discharge threshold for the battery 30 varies depending on the at least one environment parameter of the battery 30, such as the temperature of the battery 30 or therearound, the humidity around the battery 30, and/or the ambient air pressure around the battery 30.

From this viewpoint, the ECU 50 is configured to change the upper limit of the allowable charging-voltage range for the battery 30 in accordance with the value of the at least one environment parameter to thereby reduce the occurrence of partial discharge in the battery 30. This therefore enables the battery 30 to be charged while preventing damage of the insulation performance in the battery 30.

Additionally, the ECU 50 is configured to change the target SOC of the battery 30 for charging of the battery 30 in accordance with the value of the at least one environment parameter to thereby change the output voltage, i.e. discharge voltage, of the battery 30 when the SOC of the battery 30 has reached the target SOC. This reduces the occurrence of partial discharge in the battery 30, making it possible to charge the battery 30 while preventing damage of the insulation performance in the battery 30.

Second Embodiment

Figure 7:
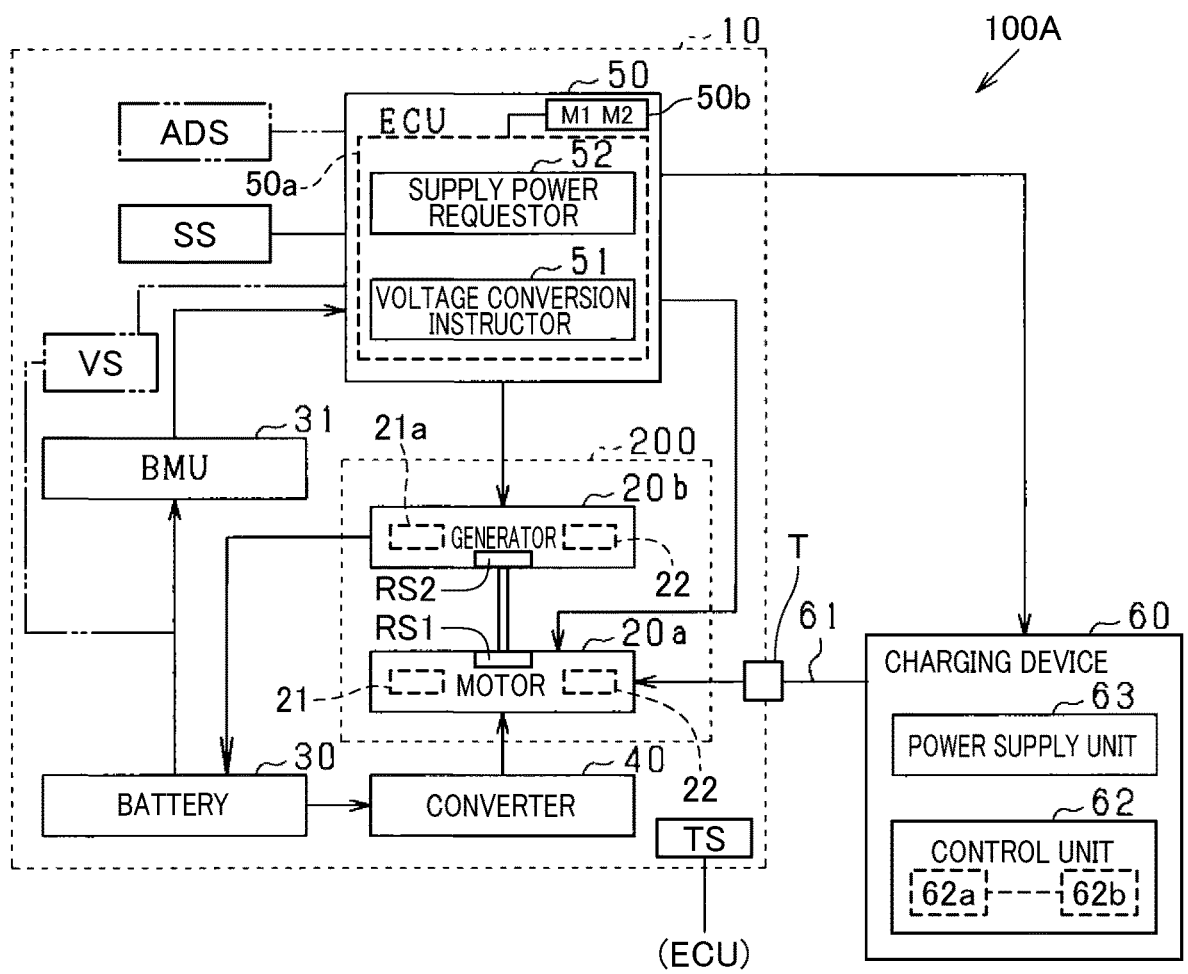
FIG. 7 is a block diagram schematically illustrating an example of the structure of a charging control system according to the second embodiment of the present disclosure.
Figure 8:
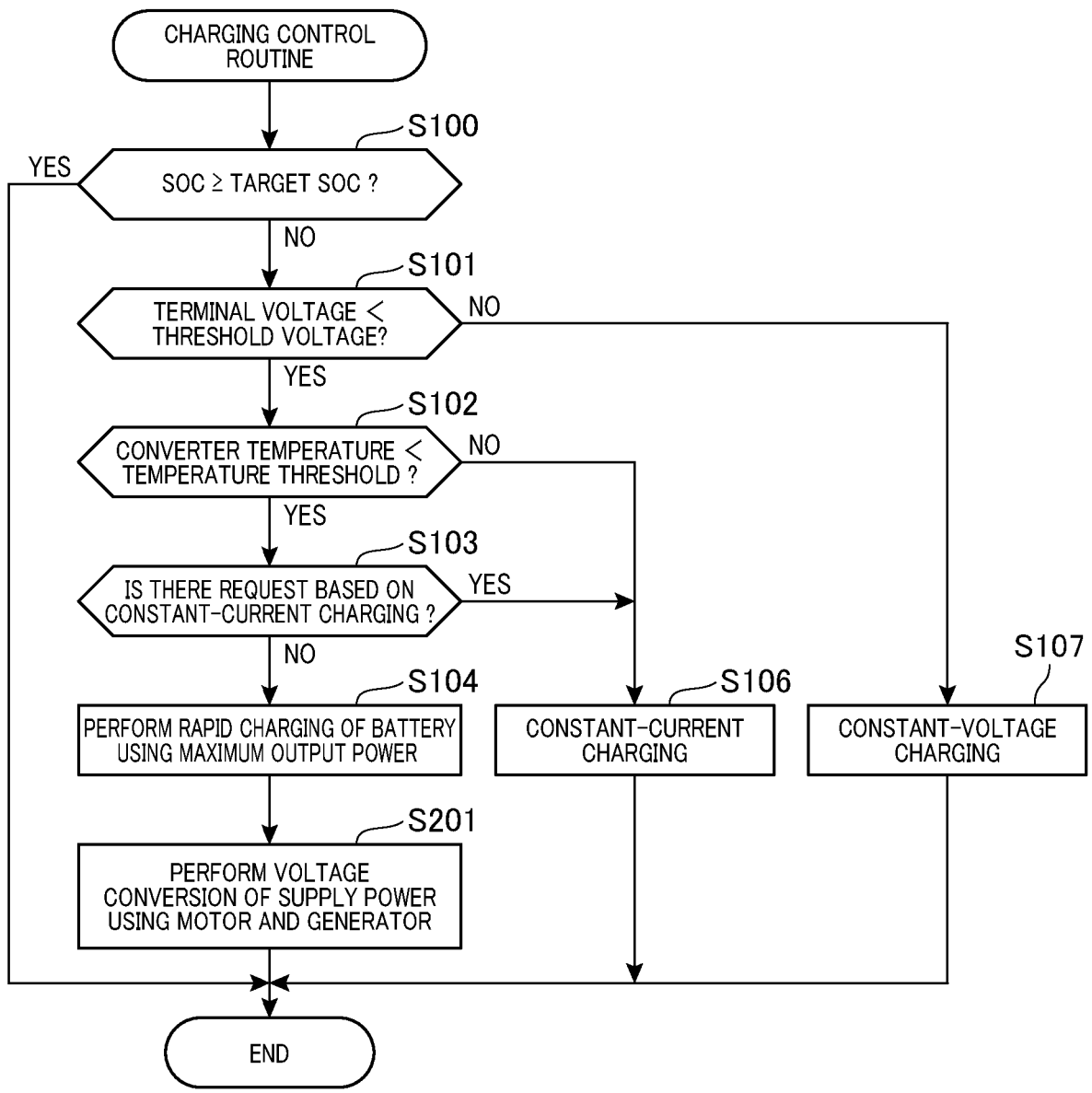
FIG. 8 is a flowchart schematically illustrating a charging control routine carried out by an ECU illustrated in FIG. 7.

The following describes the second embodiment of the present disclosure with reference to FIGS. 7 and 8.

As illustrated in FIG. 7, a charge control system 100A according to the second embodiment includes a voltage conversion device 200 including a motor unit 20a in place of the MG 20 of the first embodiment and a generator unit 20b.

The motor unit 20a includes a rotating shaft RS1, the motor 21 coupled to the rotating shaft RS1, and the inverter 22. The motor 21 is electrically connected to the battery 30 via the inverter 22 and the converter 40. The motor unit 20a is configured such that the rotating shaft RS1 is mechanically couplable to the driving axle of the vehicle 10 via the gear mechanism.

While the rotating shaft RS1 is selectably coupled to the driving axel, the motor 21 operates in the power running mode to generate torque, i.e. rotational power, that rotatably drives the driving axle to thereby rotatably drive the driving wheels via the gear mechanism.

That is, the ECU 50 is configured to instruct the converter 40 to convert the DC terminal voltage across the battery 30 into an adjusted voltage, and instruct the inverter 22 to convert DC power with the adjusted DC voltage into AC power, thus supplying the AC power to the motor 21. This causes the motor 21 to operate in the power running mode, thus supplying torque to the driving axle of the vehicle 10.

The motor 21 can be electrically connected to the battery 30 via the inverter 22 without being connected via the converter 40. That is, the terminal voltage across the battery 30 can be directly input to the inverter 21.

The generator unit 20b includes a rotating shaft RS2, a generator 21a coupled to the rotating shaft RS2, and the inverter 22. The generator 21 is electrically connected to the battery 30 via the inverter 22. The generator unit 20b is configured such that the rotating shaft RS2 is mechanically couplable to the driving axle of the vehicle 10 via the gear mechanism, and also couplable to the rotating shaft RS2 of the motor unit 20a.

While the rotating shaft RS2 is selectably coupled to the driving axel, the generator 21a operates in the regenerative mode to generate electrical power based on torque transferred from the driving axle, i.e. kinetic energy of the vehicle 10.

That is, the ECU 50 is configured to instruct the inverter 22 to cause the generator 21a to operate in the regenerative mode to generate electrical power, thus supplying generated electrical power to the battery 30. That is, the generator 21a is configured to output generated electrical power such that an output voltage and an output current of the generated electrical power are respectively within the allowable charging-voltage range and the allowable charging-current range for the battery 30.

Note that the generator 21a of the generator unit 20b can be electrically connected to the battery 30 via the converter 40. That is, the output voltage of the generated electrical power outputted from the generator unit 20b can be converted by the converter 40 into an adjusted voltage, and adjusted power with the adjusted voltage can be supplied to the battery 30.

Additionally, the ECU 50 is configured to use the motor unit 20a and the generator unit 20b as a voltage conversion device in place of the converter 40 to thereby perform voltage conversion of supply power outputted from the charging device 60 in the rapid charging of the battery 30.

Next, the following describes a charging control routine carried out by the ECU 50, i.e. the CPU 50a thereof, of the second embodiment in accordance with instructions of a corresponding at least one program stored in the memory unit 50b with reference to the flowchart of FIG. 8. Note that the ECU 50 carries out the charging control routine every predetermined period while the charging device 60 is communicably connected to the vehicle 10 via, for example, the power supply adapter 61 and the connection terminal T. Note that, in FIG. 8, operations, which are identical to those illustrated in FIG. 3, are respectively assigned with identical step numbers of those illustrated in FIG. 3, so that descriptions of the identical operations in FIG. 8 are omitted. The different steps in FIG. 8 are therefore will be mainly described hereinafter.

In step S104, the ECU 50 serves as the supply power requestor 52 to request the charging device 60 to output, to the voltage conversion device 200, supply power having a constant voltage and a constant current while the supply power is within the allowable charging-power range for the battery 30 and the constant voltage of the supplied electrical power is higher than the allowable charging-voltage range for the battery 30.

Following the operation in step S104, the charging control routine proceeds to step S201.

In step S201, the ECU 50 serves as, for example, the voltage conversion instructor 51 to couple the rotating shaft RS1 of the motor unit 20a to the rotating shaft RS2 of the generation unit 20b, and send the supply power, i.e. the maximum output power, outputted from the charging device 60 to the motor 21 of the motor unit 20a, thus driving the motor 21. That is, the voltage conversion instructor 51 instructs the motor 21 to convert the supply power into rotational drive power, i.e. torque, that rotates the rotating shaft RS1 of the motor unit 20a.

Because the rotating shaft RS1 of the motor unit 20a is coupled to the rotating shaft RS2 of the generator unit 20b, rotation of the rotating shaft RS1 of the motor unit 20a causes the rotating shaft RS2 of the generator unit 20b to rotate, so that the generator 21a converts the rotational power of the rotating shaft RS2 into electrical power.

That is, the ECU 50 causes the motor 21 to rotate the rotating shaft RS1 based on the supply power outputted from the charging device 60 to thereby cooperatively rotate the rotating shaft RS2 of the generator unit 20b, thus transferring rotational drive power of the motor 21 to the generator 21a. This causes the generator 21 to generate electrical power, i.e. charging supply power, while converting the voltage of the supply power outputted from the charging device 60 into a charging voltage of the charging power such that the charging voltage and a charging current of the charging power obtained by the generator 21a are within the respective charging-voltage range and charging-current range for the battery 30 in step S201.

This results in the charging supply power being supplied to the battery 30, thus charging the battery 30. After the operation in step S201, the ECU 50 terminates the charging control routine.

As described in detail above, the ECU 50 according to the second embodiment is configured to (1) Cause the motor 21 of the motor unit 20a to convert the supply power outputted from the charging device 60 into rotational drive power (2) Cause the generator 21a of the generation unit 20b to generate electrical power based on the rotational drive power transferred to the generator 21a from the motor 21 while converting the voltage of the supply power outputted from the charging device 60 into the charging voltage of the charging power such that the charging voltage and the charging current of the charging power obtained by the generator 21a are within the respective charging-voltage range and charging-current range for the battery 30

This configuration therefore eliminates the need of providing an additional converter in addition to the voltage conversion device 200 if the voltage conversion device 200 is installed in the vehicle 10.

Third Embodiment

The following describes the third embodiment of the present disclosure with reference to FIGS. 9A to 12.

Figure 9A:
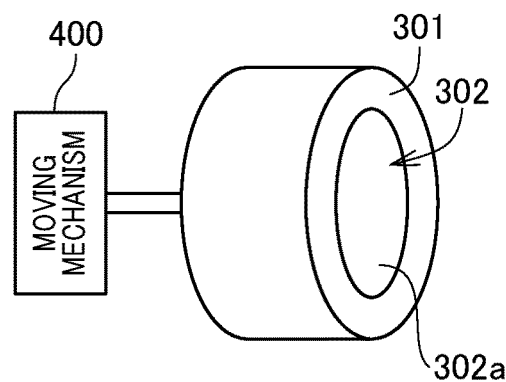
FIG. 9A is a structural view of an MG according to the third embodiment of the present disclosure.
Figure 9B:
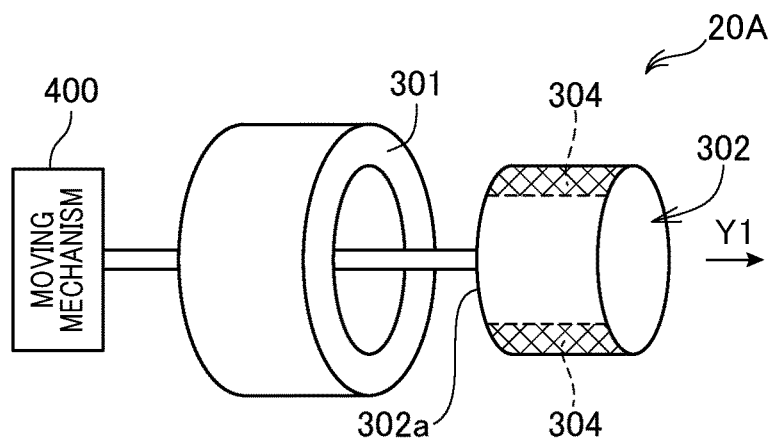
FIG. 9B is a structural view of the MG while a rotor of the MG has been separated from a stator of the MG according to the third embodiment.
Figure 10:
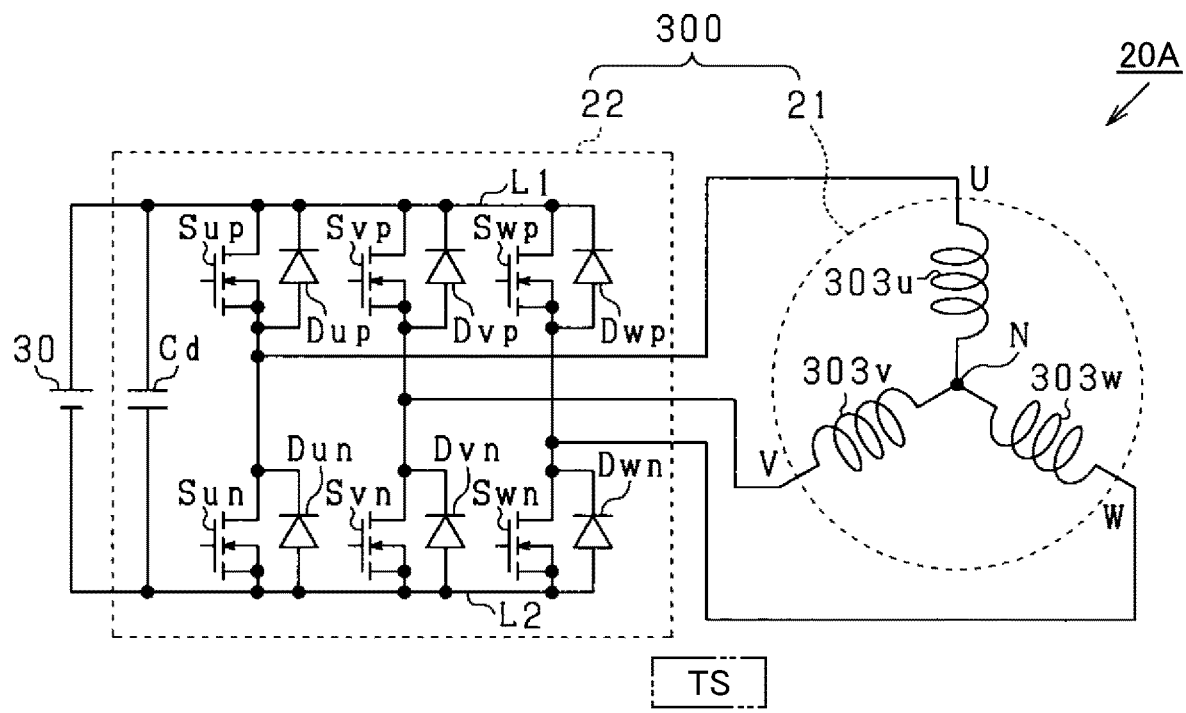
FIG. 10 is a circuit diagram schematically illustrate a circuit structure of the MG according to the third embodiment.

As illustrated in FIGS. 9A and 10, an MG 20A of a charge control system according to the third embodiment includes a stator 301 and a rotor 302.

The stator 301 includes a cylindrical tubular coil assembly comprised of three-phase, i.e. U-, V-, and W-phase, stator coils, that is, armature coils, 303u, 303v, and 303w. For example, the three-phase stator coils 303u, 303v, and 303w are encased in resin to be assembled to shape as a cylindrical tubular shape. In other words, the MG 20A with the stator 301 of the third embodiment is designed as a coreless MG with a coreless stator. The three-phase stator coils 303u, 303v, and 303w have a phase difference of, for example, $2\pi/3$ radian from each other. Each of the three-phase stator coils three-phase 303u, 303v, and 303w has opposing first and second ends.

The rotor 302 is comprised of a cylindrical tubular rotor core 302a rotatably disposed in the stator 301 to be coaxial with the stator 301 with a gap between the rotor core 302a and the stator 301.

The rotor 302 is also comprised of at least one pair of N- and S-pole permanent magnets 304 (see FIG. 9B hereinafter) mounted to the rotor core 302a. The rotor 302 has a direct axis (d-axis) in line with a direction of magnetic flux created by the N pole of the at least one magnetic-pole pair. The rotor 302 also has a quadrature axis (q-axis) with a phase being π/2-radian electrical angle leading with respect to the d-axis during rotation of the rotor 302. In other words, the q-axis is electromagnetically perpendicular to the d-axis. The d and q axes constitute a d-q coordinate system defined relative to the rotor 302.

The inverter 22 is electrically connected to the three-phase stator coils 303u, 303v, and 303w, and to the battery 30.

Specifically, the MG 20A and the battery 30 can establish electrical connection therebetween via the inverter 22.

The inverter 22 includes (1) A first series switch circuit comprised of series-connected high- and low-side (upper- and lower-arm) switches Sup and Sun (2) A second series switch circuit comprised of series-connected high- and low-side (upper- and lower-arm) switches Svp and Svn (3) A third series switch circuit comprised of series-connected high- and low-side (upper- and lower-arm) switches Swp and Swn.

The first to third pairs of switches are parallely connected to each other in full bridge configuration.

The connection point through which the switches Sup and Sun of the first pair are connected to each other in series is connected to the first end of the U-phase winding 303u. Similarly, the connection point through which the switches Svp and Svn of the second pair are connected to each other in series is connected to the first end of the V-phase winding 303v. Moreover, the connecting point through which the switches Swp and Swn of the third pair are connected to each other in series is connected to the first end of the W-phase winding 303w. The second ends of the three-phase windings 303u, 303v, and 303w are commonly connected to each other in, for example, star-configuration; the common connection point serves as a neutral point N.

The first embodiment uses power MOSFETs, such as N-channel MOSFETs, as the switches Sup to Swn. Each of the switches, i.e. the N-channel MOSFETs, Sup to Swn includes a corresponding one of intrinsic diodes Dup, Dun, Dvp, Dvn, Dwp, and Dwn serving as a flyback diode. Each intrinsic diode Dup, Dun, Dvp, Dvn, Dwp, and Dwn is configured to enable only current flow from the source serving as a low-side terminal to the drain serving as a high-side terminal.

If the first embodiment uses IGBTs as the respective switches, flyback diodes are additionally provided to be connected in antiparallel to the respective switches. That is, the anode of each flyback diode is connected to the source of the corresponding switch, and the cathode of each flyback diode is connected to the drain of the corresponding switch.

The high-side terminals, i.e. the drains, of the upper-arm switches Sup, Svp, and Swp are connected to the positive terminal of the battery 30 via a high-side bus line, i.e. a positive busbar, L1; these connection points are referred to as drain connection points. The low-side terminals, i.e. the sources, of the lower-arm switches Sun, Svn, and Swn are connected to the negative terminal of the battery 30 via a low-side bus line, i.e. a negative busbar, L2; these connection points are referred to as source connection points.

Each of the switches Sup to Swn has a control terminal, i.e. the gate, connected to the ECU 50.

A capacitor Cd is connected in parallel to the battery 30 for smoothing DC voltages sent between the battery 30 and the inverter 22.

The sensors SS include a voltage sensor, a current sensor, and a rotational angle sensor.

The voltage sensor is for example arranged in parallel to the smoothing capacitor Cd. The voltage sensor measures a voltage across the smoothing capacitor Cd as an inverter input voltage, i.e. a power supply voltage, to the inverter 22; the inverter input voltage is based on the terminal voltage across the battery 30. The voltage sensor sends a measurement signal indicative of the measured inverter input voltage to the ECU 50.

The current sensor is arranged to measure at least two-phase currents flowing through the corresponding at least two-phase stator coils of the MG 20A. Then, the current sensor sends a measurement signal indicative of the measured at least two-phase currents to the ECU 50.

The rotational angle sensor includes, for example, a resolver. The rotational angle sensor measures, i.e. monitors, a rotational angle, i.e. an electrical rotational angle, of the rotor 302 of the MG 20A. Then, the rotational angle sensor sends a measurement signal indicative of the measured rotational angle of the rotor 302 to the ECU 50.

The ECU 50 is configured to generate, based on the measurement signals sent from the sensors SS, upper-arm drive signals to the respective upper-arm switches Sup, Svp, and Swp, and lower-arm drive signals to the respective lower-arm switches Sun, Svn, and Swn to alternately turn on the upper-arm switch of each phase and the lower-arm switch of the corresponding phase. The drive signal for each switch includes an on command for instructing the corresponding switch to be switched from an off state to an on state, and an off command for instructing the corresponding switch to be switched from the on state to the off state.

The ECU 50 is configured to use the inverter 22 and the motor 21 of the MG 20A as a voltage conversion device 300 (see FIGS. 11A and 11B) in place of the converter 40 to thereby perform a voltage conversion, for example, a voltage reduction according to the third embodiment, of supply power outputted from the charging device 60 in the rapid charging of the battery 30.

Figure 11A:
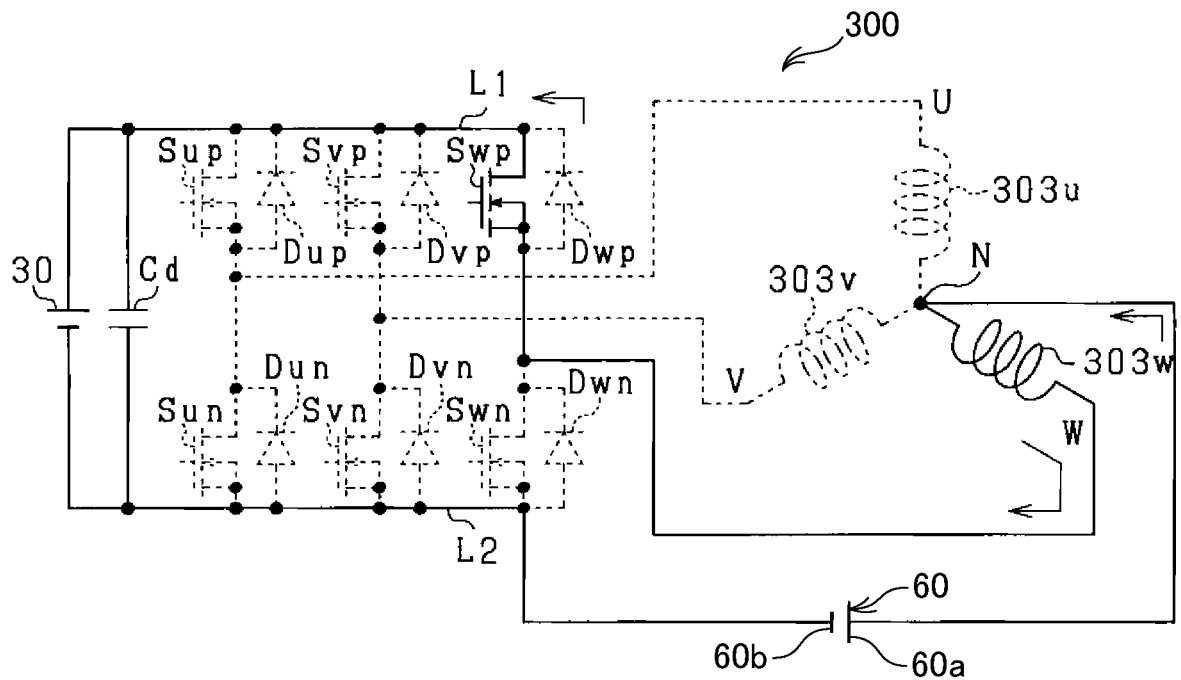
FIGS. 11A and 11B are a joint diagram schematically illustrating how to perform a voltage reduction according to the third embodiment.
Figure 11B:
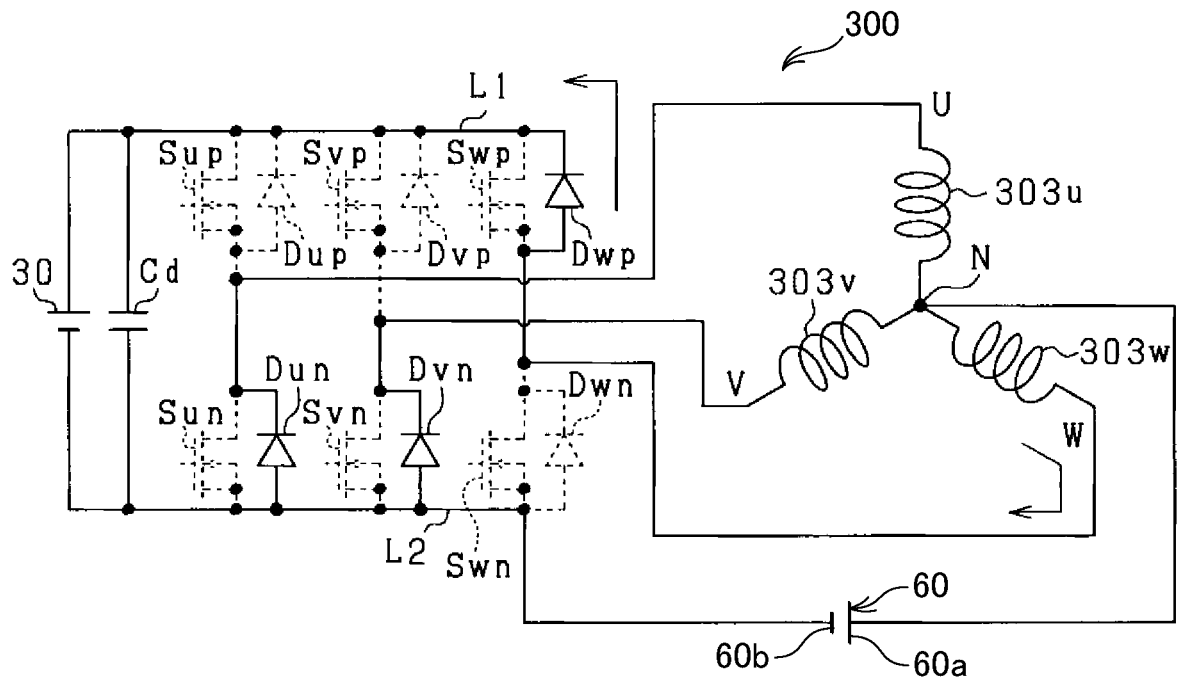

The following describes in detail how the ECU 50 performs a voltage reduction of the supply power outputted from the charging device 60 with reference to FIGS. 11A and 11B.

The ECU 50 is configured to use a high-side switch Sjp (j=u, v, or w), diodes Djp, Djn, and a j-phase stator coil 303j as the voltage conversion device i.e. the voltage reduction device, 300, to thereby reduce, i.e. step down, the voltage of the supply power outputted from the charging device 60. In particular, the ECU 50 of the third embodiment uses the w-phase high-side switch Swp, the w-phase diodes Dwp, Dwn, and the w-phase stator coil 303w as the voltage conversion device, i.e. the voltage reduction device, 300.

Specifically, the charging device 60 of the third embodiment is configured such that the positive terminal (see 60a in each of FIGS. 11A and 11B) of the charging device 60 is connected to the neutral point N of the three-phase stator coils 303u, 303v, and 303w, and the negative terminal (see 60b in each of FIGS. 11A and 11B) of the charging device 60 is connected to the negative busbar L2 of the inverter 22.

The ECU 50 controls the charging device 60 to output supply power to the vehicle 10 and turns on the high-side switch Swp to thereby provide a closed circuit comprised of the charging device 60, the W-phase stator coil 303w, the on-state switch Swp, and the battery 30. This results in the w-phase stator coil 303w being connected to the charging device 60 in series. This enables a current to be supplied from the charging device 60 to the w-phase stator coil 303w, resulting in magnetic energy being charged in the w-phase stator coil 303w.

Thereafter, the ECU 50 controls the charging device 60 to stop power supply to the vehicle 10 and turns off the high-side switch Swp. This causes the w-phase stator coil 303w to generate electromotive force, i.e. back electromotive force, across the w-phase stator coil 303w to maintain a current flowing from the w-phase stator coil 303w to the inverter 22. The current based on the electromagnetic force across the w-phase stator coil 303w flows through the flywheel diodes Dwp, Dun, and Dvn via the battery 30. Because the level of the electromotive force is lower than the voltage of the supply power outputted from the charging device 60, a reduce voltage based on the supply power of the charging device 60 is applied to the battery 30.

That is, the ECU 50 cyclically carries out turning on and turning off of the w-phase switch Swp while adjusting a duty factor of the w-phase switch Swp to a suitable value to thereby reduce the voltage of the supply power outputted from the charging device 60 to a desired voltage, thus applying the desired voltage to the battery 30. Note that the duty factor for each switching cycle represents a controllable ratio, i.e. percentage, of an on-duration of the w-phase switch Swp and the corresponding switching cycle of the w-phase switch Swp.

Figure 12:
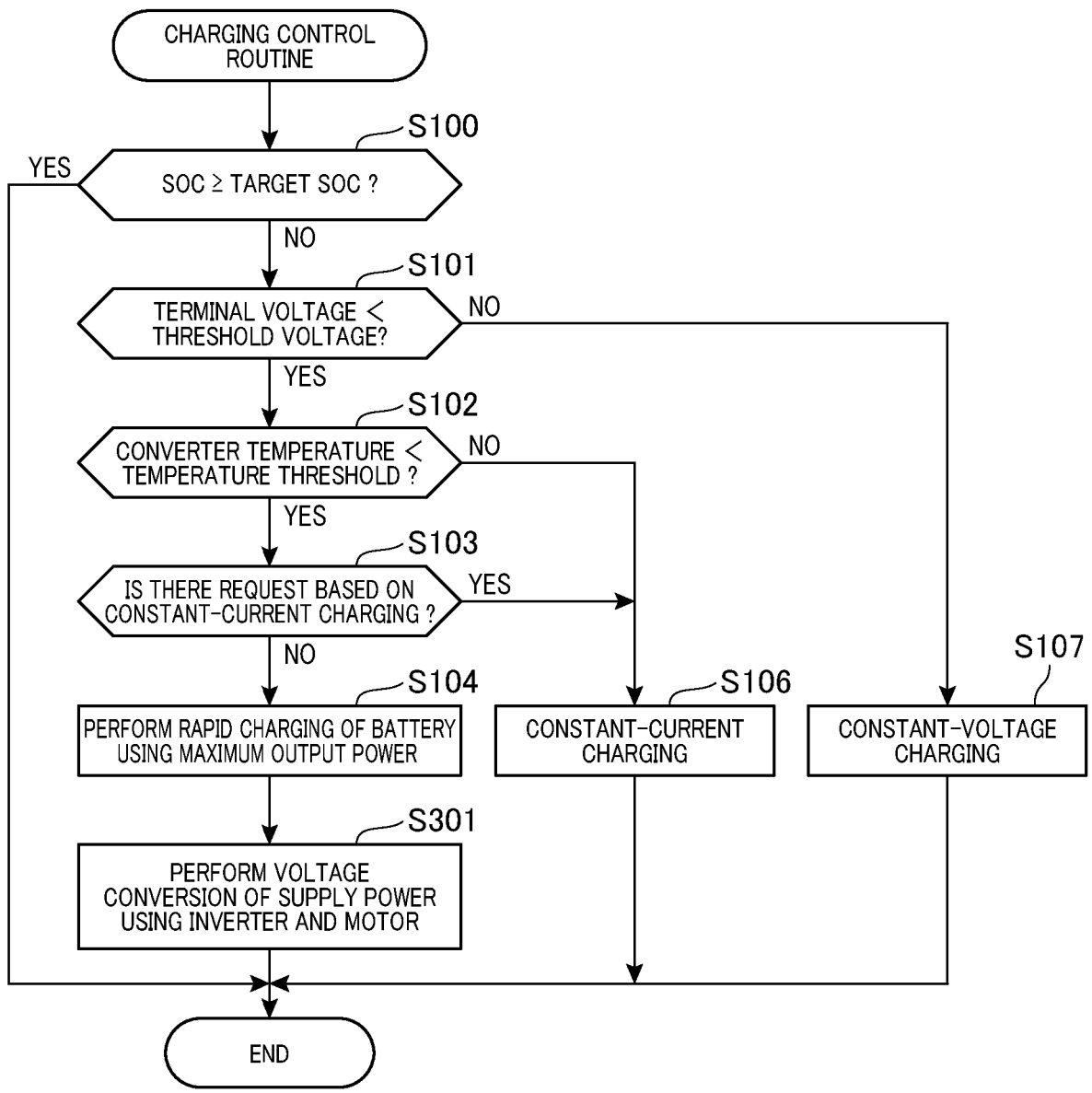
FIG. 12 is a flowchart schematically illustrating a charging control routine according to the third embodiment.

Next, the following describes a charging control routine carried out by the ECU 50, i.e. the CPU 50a thereof, of the third embodiment in accordance with instructions of a corresponding at least one program stored in the memory unit 50b with reference to the flowchart of FIG. 12. Note that the ECU 50 carries out the charging control routine every predetermined period while the charging device 60 is communicably connected to the vehicle 10 via, for example, the power supply adapter 61 and the connection terminal T. Note that, in FIG. 12, operations, which are identical to those illustrated in FIG. 3, are respectively assigned with identical step numbers of those illustrated in FIG. 3, so that descriptions of the identical operations in FIG. 12 are omitted. The different steps in FIG. 12 are therefore will be mainly described hereinafter.

In step S104, the ECU 50 serves as the supply power requestor 52 to request the charging device 60 to output, to the vehicle 10, supply power having a constant voltage and a constant current while the supply power is within the allowable charging-power range for the battery 30 and the constant voltage of the supplied electrical power is higher than the allowable charging-voltage range for the battery 30.

Following the operation in step S104, the charging control routine proceeds to step S301.

In step S301, the ECU 50 serves as, for example, the voltage conversion instructor 51 to turn on a selected high-side switch Sjp, hold the on state of the selected high-side switch, and turn off the selected high-side switch Sjp, thus reducing the voltage of the supply power outputted from the charging device 60 set forth above (see FIGS. 11A and 11B). For stepping down the voltage of the supply power outputted from the charging device 60, the ECU 50 adjusts the stepped-down voltage such that (1) The stepped-down voltage based on the supply power outputted from the charging device 60 is within the allowable charging-voltage range for the battery 30

(2) The constant current based on the supply power outputted from the charging device 60 is within the allowable charging-current range for the battery 30 in step S301.

This results in the charging supply power being supplied to the battery 30, thus charging the battery 30. After the operation in step S301, the ECU 50 terminates the charging control routine.

Note that the magnetic energy stored in a stator coil may cause the rotor 302 to rotate, resulting in the magnetic energy stored in the stator coil being consumed. This may result in the voltage conversion efficiency of the voltage conversion device 300 deteriorating.

From this viewpoint, the MG 20A of the third embodiment can be configured set forth below to thereby reduce magnetic-energy consumption by rotation of the rotor 302.

Specifically, the MG 20A can be comprised of a moving mechanism 400 configured to move, i.e. shift, the rotor 302 in an axial direction (see Y1 in FIG. 9B) of the stator 301 to thereby separate the rotor 302 from the stator 301 or insert the rotor 302 into the stator 301 under control of the ECU 50.

That is, the ECU 50 is configured to instruct the moving mechanism 400 to shift the rotor 302 in the axial direction of the stator 301 so as to be separated from the stator 301 before executing the operation in step S301, and perform the operation in step S301 while the rotor 302 is separated from the stator 301. This configuration enables, even if magnetic energy is generated from the stator coil in step S301, magnetic correlations between the generated magnetic energy and the permanent magnets 304 of the rotor 302 to become lower, making it possible to restrict rotation of the rotor 302 based on the generated magnetic energy. The moving mechanism 400 can be configured to relatively move one of the stator 301 and the rotor 302 from the other thereof.

Note that the converter 40 can be eliminated from the charge control system according to a modification of the third embodiment. The battery 30 of the charge control system according to this modification need be configured to output, to the MG 20A, a voltage and a current that are suitable for the MG 20A, and the MG 20A need be configured to similarly output, to the battery 30, a voltage and a current that are suitable for the battery 30.

The rotor 302 of the third embodiment can be configured as a magnet-less motor-generator without using permanent magnets, such as a wound rotor induction motor-generator. Because such a magnet-less motor-generator, which is comprised of a wound rotor and stator coils, stator windings, includes no permanent magnets, the moving mechanism 400 can more easily move the rotor 302 with respect to the stator 301.

As described in detail above, the ECU 50 according to the third embodiment is configured to use the voltage conversion device 300 that is comprised of a high-side switch Sjp (j=u, v, or w), diodes Djp, Djn, and a j-phase stator coil 303j for performing conversion of a voltage of supply power outputted from the charging device 60 in place of the converter 40. This configuration therefore eliminates the need of providing an additional voltage conversion device. This configuration of the ECU 50 makes it possible to use a cooling function, which has been ordinarily installed in the MG 20A, to thereby cool the voltage conversion device 300. This results in no need of an additional cooling device for cooling the additional voltage conversion device.

Note that the magnetic energy stored in a stator coil may cause the rotor 302 to rotate, resulting in the magnetic energy stored in the stator coil being consumed. This may result in the voltage conversion efficiency of the voltage conversion device 300 deteriorating.

From this viewpoint, the MG 20A of the third embodiment can be comprised of the moving mechanism 400 configured to move, i.e. shift, the rotor 302 relative to the stator 301 to thereby separate the rotor 302 from the stator 301 or insert the rotor 302 into the stator 301 under control of the ECU 50.

Additionally, the ECU 50 is configured to instruct the moving mechanism 400 to move the rotor 302 so as to be separated from the stator 301 before causing the voltage conversion device 300 to execute voltage conversion of the voltage of the supply power outputted from the charging device 60.

This configuration enables, even if magnetic energy is generated from the stator coil in the voltage conversion, magnetic correlations between the generated magnetic energy and the permanent magnets 304 of the rotor 302 to become lower, making it possible to restrict rotation of the rotor 302 based on the generated magnetic energy. This results in higher voltage conversion efficiency of the voltage conversion device 300.

In particular, the MG 20A can be configured as a coreless MG with a coreless stator. This configuration therefore makes it possible to prevent a core of the stator 301 from being attracted by the permanent magnets 304 of the rotor 302, thus preventing the rotor 302 from being difficult to move relative to the stator 301. That is, this configuration makes it possible to move the rotor 302 relative to the stator 301 easier than an MG with a stator core.

Modifications

Each embodiment of the present disclosure has been described, but the present disclosure is not limited to the corresponding embodiment, and can be variably modified.

In each embodiment, the charging device 60 can be modified to output a current of supply power, which is higher than the allowable charging-current range for the battery 30 as long as the supply power is within the allowable charging-power range for the battery 30. The voltage conversion device according to this modification can be configured to boost the voltage of the supply power such that the charging current output from the voltage conversion device to the battery 30 is set to be lower than the current of the supply power from the charging device 60.

Note that the first embodiment can use the converter 40 to boost the voltage of the supply power outputted from the charging device 60, and the second embodiment can use the voltage conversion device 200, comprised of the motor unit 20a and the generator unit 20b, to boost the voltage of the supply power outputted from the charging device 60.

Next, the following describes how the third embodiment boosts the voltage of the supply power outputted from the charging device 60.

The ECU 50 is configured to use a low-side switch Sjn (j=u, v, or w), a diode Djn, and a j-phase stator coil 303j as a voltage conversion device, i.e. a voltage booster circuit, 300A, to thereby boost, i.e. step up, the voltage of the supply power outputted from the charging device 60. In particular, the ECU 50 of the third embodiment uses the w-phase low-side switch Swn, the w-phase diode Dwn, and the w-phase stator coil 303w as the voltage conversion device, i.e. the voltage booster, 300A.

Specifically, the charging device 60 of the third embodiment is configured such that the positive terminal 60a of the charging device 60 is connected to the neutral point N of the three-phase stator coils 303u, 303v, and 303w, and the negative terminal 60b of the charging device 60 is connected to the negative busbar L2 of the inverter 22.

Figure 13A:
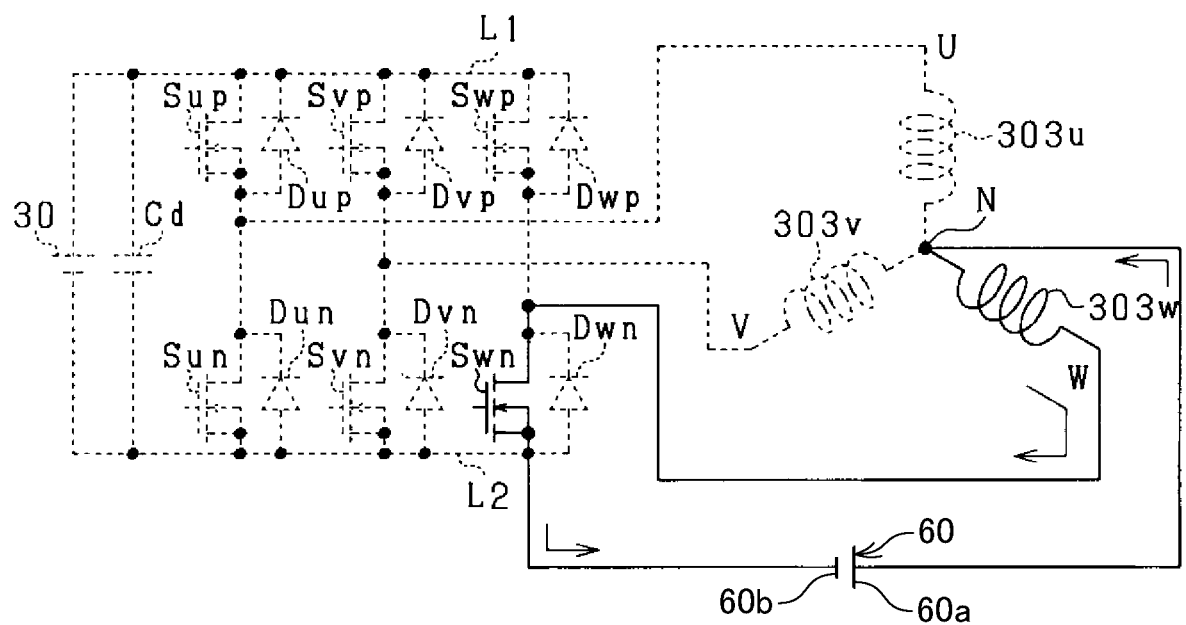
FIGS. 13A and 13B are a joint diagram schematically illustrating how to boost a voltage of supply power according to a modification of each of the first to third embodiments.
Figure 13B:
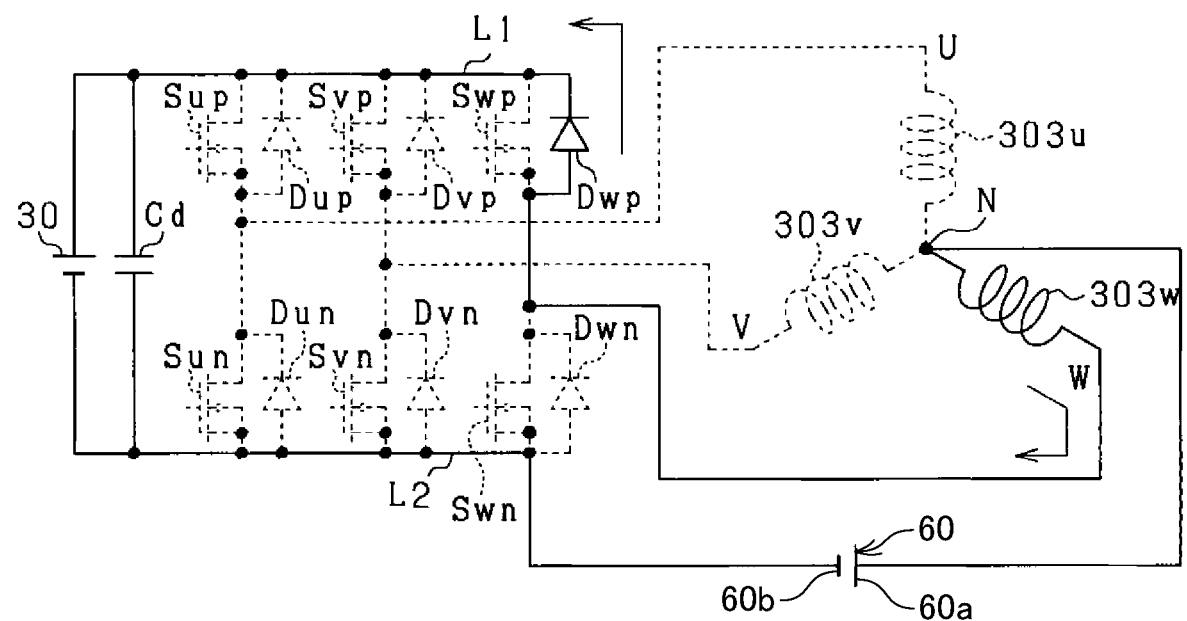

The ECU 50 controls the charging device 60 to output supply power to the vehicle 10 and turns on the low-side switch Swn to thereby provide a closed circuit comprised of the charging device 60, the W-phase stator coil 303w, and the on-state switch Swn. This results in a current being supplied from the charging device 60 to the w-phase stator coil 303w, resulting in magnetic energy being charged in the w-phase stator coil 303w (see FIG. 13A).

Thereafter, the ECU 50 turns off the low-side switch Swn. This causes the w-phase stator coil 303w to generate electromotive force, i.e. back electromotive force, across the w-phase stator coil 303w to maintain a current flowing from the w-phase stator coil 303w to the inverter 22. That is, the sum of the voltage of the supply power outputted from the charging device 60 and the electromotive force across the w-phase stator coil 303w is applied to the battery 30. That is, the boosted voltage of the charging device 60 based on the electromotive force across the w-phase stator coil 303w is applied to the battery 30.

The charge control system according to each embodiment can be comprised of a plurality of voltage conversion devices. For example, the charge control system according to the present disclosure can include a plurality of the converters 40, or the present disclosure can include the converter 40 according to the first embodiment, and the voltage conversion device 200 comprised of the motor unit 20a and the generator unit 20b according to the second embodiment. Additionally, the charge control system according to the present disclosure can include the converter 40 according to the first embodiment, and the voltage conversion device 300 comprised of the inverter 22 and the motor 21.

Additionally, the charge control system according to the present disclosure can include the converter 40 according to the first embodiment, the voltage conversion device 200 comprised of the motor unit 20a and the generator unit 20b according to the second embodiment, and the voltage conversion device 300 comprised of the inverter 22 and the motor 21. In this modification based on the combination of the first to third embodiments, one of the motor 20a and the generator 20b should be replaced with the MG 20.

Specifically, in this modification, temperature sensors TS can be additionally provided in the vehicle 10 for respectively measuring the temperature of the voltage conversion device 200 and the temperature of the voltage conversion device 300, and for respectively outputting, to the ECU 50, a measurement signal indicative of the voltage conversion device 200 and a measurement signal indicative of the voltage conversion device 300.

If the charge control system is comprised of the converter 40, the voltage conversion device 200, and the voltage conversion device 300, the ECU 50 can be configured to (1) Obtain the temperatures of the respective converter 40, the voltage conversion device 200, and the voltage conversion device 300 based on the measurement signals sent from the respective temperature sensors TS (2) Select one of the converter 40, the voltage conversion device 200, and the voltage conversion device 300 in accordance with the temperatures of the respective converter 40, the voltage conversion device 200, and the voltage conversion device 300

Specifically, the ECU 50 can be configured to (1) Select one of the converter 40, the voltage conversion device 200, and the voltage conversion device 300; the temperature of the selected one of the converter 40, the voltage conversion device 200, and the voltage conversion device 300 is the lowest in all the temperatures (2) Cause the selected one of the converter 40, the voltage conversion device 200, and the voltage conversion device 300 to perform voltage conversion of the supply power outputted from the charging device 60

This enables voltage conversion of the supply power outputted from the charging device 60 to be carried out while preventing a malfunction or a failure having occurred in the selected one of the converter 40, the voltage conversion device 200, and the voltage conversion device 300 due to the temperature thereof.

The ECU 50 can be configured to change selection of one of the converter 40, the voltage conversion device 200, and the voltage conversion device 300 in accordance with, for example, the charging time and/or the SOC of the battery 30.

Each of the first to third embodiments can be configured such that at least part of the functions of the ECU 50 associated with the corresponding charging control routine can be installed in the control unit 62 of the charging device 60. In this modification of each embodiment, various items of information associated with the corresponding charging control routine, which are sent to the ECU 50, need be sent to the control unit 62 of the charging device 60. Each of the first to third embodiments is configured to set the level of supply power within the allowable charging-power range for the battery 30. As described above, the voltage conversion devices 40, 200, and 300 have a voltage conversion efficiency within the range from approximately 80% to 95%. From this viewpoint, each of the first to third embodiments can be configured to set the allowable charging-power range for the battery 30 in accordance with the voltage conversion efficiency of a corresponding one of the voltage conversion devices 40, 200, and 300. Specifically, each of the first to third embodiments can be configured to set, based on energy loss based on voltage conversion, the upper limit of the allowable charging-power range for the battery 30 to be greater by ten or twenty percent more as compared with the upper limit thereof without no energy loss.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A charging control apparatus applicable to a vehicle that performs charging of a chargeable and dischargeable power storage based on supply power from an external power source, the power storage having a predetermined allowable charging-power range, a predetermined allowable charging-voltage range, and a predetermined allowable charging-current range, the charging control apparatus comprising:
   a supply power requestor configured to request the external power source to output supply power having a constant voltage and a constant current;
   a voltage conversion device; and
   a voltage conversion instructor configured to instruct the voltage conversion device to:
      perform voltage conversion of the supply power from the external power source such that converted supply power has a charging voltage and a charging current that are respectively within the allowable charging-voltage range and allowable charging-current range; and
      output the converted supply power to the power storage to thereby charge the power storage.

2. The charging control apparatus according to claim 1, wherein:
   the external power source has a predetermined allowable output power range; and
   the supply power requestor is configured to request the external power source to output the supply power having the constant voltage and the constant current such that a level of the supply power is within the allowable charging-power range and corresponds to an upper limit of the allowable output power range.

3. The charging control apparatus according to claim 1, wherein:
   the power storage has a terminal voltage thereacross; and
   the supply power requestor is configured to:
      determine whether the terminal voltage across the power storage is lower than a threshold voltage;
      request the external power source to output the supply power having the constant voltage and the constant current such that at least one of the constant voltage and the constant current is higher than at least one of the allowable charging-voltage range and the allowable charging-current range upon determining that the terminal voltage across the power storage is lower than the threshold voltage; and
      request the external power source to output the supply power having the constant voltage and the constant current such that each of constant voltage and the constant current is within the corresponding one of the allowable charging-voltage range and the allowable charging-current range upon determining that the terminal voltage across the power storage is equal to or higher than the threshold voltage.

4. The charging control apparatus according to claim 1, wherein:
   the supply power requestor is configured to select, in accordance with a selection condition, one of:
   a first charging mode that requests the external power source to output, as the supply power, first supply power having the constant voltage and the constant current such that each of the constant voltage and the constant current is higher than the corresponding one of the allowable charging-voltage range and the allowable charging-current range during a predetermined first charging period; and
   a second charging mode that requests the external power source to output, as the supply power, second supply power having the constant current such that the constant current is within the allowable charging-current range during a predetermined second charging period; and
   the voltage conversion device is configured not to perform voltage conversion of the second supply power from the external power source when the supply power requestor selects the second charging mode.

5. The charging control apparatus according to claim 4, wherein:

the selection condition includes a temperature condition of the voltage conversion device.

6. The charging control apparatus according to claim 1, wherein:
the voltage conversion device comprises a plurality of voltage conversion devices; and
the voltage conversion instructor is configured to:
select, based on a temperature condition of each of the voltage conversion devices, one of the voltage conversion devices; and
instruct the selected one of the voltage conversion devices to perform voltage conversion of the supply power from the external power source.

7. The charging control apparatus according to claim 1, wherein:
the vehicle includes a rotary electric machine driven based on power supplied from the power storage, and a converter configured to convert a terminal voltage across the power storage into an adjusted voltage and to supply the adjusted voltage to the rotary electric machine; and
the voltage conversion instructor is configured to use the converter as the voltage conversion device for charging of the power storage.

8. The charging control apparatus according to claim 1, wherein:
the vehicle includes a rotary electric machine driven based on power supplied from the power storage;
the rotary electric machine comprises an inverter and a motor with plural-phase coils;
the inverter comprises:
a series switch circuit comprised of a high-side switch and a low-side switch connected in series to each other for each phase coil of the motor; and
a diode connected across each of the high- and low-side switches to enable only current flow from a low-side terminal of the corresponding switch to a high-side terminal thereof;
the power storage has opposing positive and negative terminals;
the series switch circuit has a first end at the high-side switch connected to the positive terminal of the power storage via a positive bus line, and has a second end at the low-side switch connected to the negative terminal of the power storage via a negative bus line;
each phase coil has opposing first and second ends, the first end being connected to the high- and low-side switches of the corresponding phase, the second ends of the respective phase coils being commonly connected to each other at a neutral point;
the phase coils, the high- and low-side switches, and the diodes constitute a voltage conversion circuit that is used for the voltage conversion device;
the external power source has opposing positive and negative terminals, the positive terminal of the external power source being connected to the neutral point, the negative terminal of the external power source being connected to the negative bus line; and
the voltage conversion instructor is configured to turn on or off at least one of the switches included in the voltage conversion circuit to instruct the voltage conversion circuit to perform voltage conversion of the supply power from the external power source.

9. The charging control apparatus according to claim 8, wherein:
the rotary electric machine comprises:
a stator;
a rotor arranged to be close to the stator;
a moving mechanism configured to move the rotor relative to the stator; and
a moving controller configured to move the rotor relative to the stator before instructing the voltage conversion circuit to perform power conversion, thus separating the rotor from the stator.

10. The charging control apparatus according to claim 1, wherein:
the vehicle includes a motor unit having a first rotating shaft and a power running function, and a generator unit having a second rotating shaft and a generation function;
the first rotating shaft of the motor unit is coupled to the second rotating shaft of the generator unit such that rotational power of the first rotating shaft is transferable to the second rotating shaft;
the voltage conversion instructor is configured to use the motor unit and the generator unit as the voltage conversion device for charging of the power storage; and
the voltage conversion instructor is configured to instruct the external power source to output the supply power to the motor unit to thereby convert the supply power into rotational drive power for rotating the first drive shaft of the motor unit, so that the rotational drive power causes the second drive shaft of the generator unit to rotate,
the generator unit being configured to generate, based on rotation of the second drive shaft, electrical power, thus outputting the electrical power to the power storage as charging power.

11. The charging control apparatus according to claim 1, wherein:
the voltage conversion instructor is configured to change the allowable charging-power range for the power storage in accordance with at least one environment parameter indicative of at least one of a surrounding environment of the power storage.

12. The charging control apparatus according to claim 1, wherein:
the supply power requestor is configured to:
request the external power source to output the supply power until a state of charge of the power storage has reached a target state of charge; and
change the target state of charge of the power storage depending on at least one environment parameter indicative of at least one surrounding environment of the power storage.

13. A charging control system comprising:
a vehicle including a chargeable and dischargeable power storage, the power storage having a predetermined allowable charging-power range, a predetermined allowable charging-voltage range, and a predetermined allowable charging-current range;
an external power source that outputs supply power to the vehicle for charging of the power storage; and
a charging control apparatus that controls charging of the power storage,
the vehicle comprising a voltage conversion device; and
the charging control apparatus comprising:
a supply power requestor configured to request the external power source to output supply power having a constant voltage and a constant current; and
a voltage conversion instructor configured to instruct the voltage conversion device to:
perform voltage conversion of the supply power from the external power source such that the converted supply power has a charging voltage and a charging current that are respectively within the allowable charging-voltage range and allowable charging-current range; and output the converted supply power to the power storage to thereby charge the power storage.

\* \* \* \* \*